(12) United States Patent
Yamada et al.

(10) Patent No.: US 8,736,851 B2
(45) Date of Patent: May 27, 2014

(54) FILM THICKNESS MEASURING DEVICE AND FILM THICKNESS MEASURING METHOD

(71) Applicant: Nireco Corporation, Tokyo (JP)

(72) Inventors: Takeo Yamada, Yokohama (JP); Takeshi Yamamoto, Tokyo (JP); Shingo Kawai, Tokyo (JP)

(73) Assignee: Nireco Corporation, Tokyo (JP)

( * ) Notice: Subject to any disclaimer, the term of this patent is extended or adjusted under 35 U.S.C. 154(b) by 0 days.

(21) Appl. No.: 14/036,533

(22) Filed: Sep. 25, 2013

(65) Prior Publication Data

US 2014/0022564 A1    Jan. 23, 2014

Related U.S. Application Data

(63) Continuation of application No. PCT/JP2011/002163, filed on Apr. 12, 2011.

(51) Int. Cl.
   *G01B 11/06* (2006.01)

(52) U.S. Cl.
   USPC ............................................. 356/632

(58) Field of Classification Search
   USPC .................................. 356/630, 632
   See application file for complete search history.

(56) References Cited

U.S. PATENT DOCUMENTS 5,610,392 A *  3/1997  Nagayama et al. ........... 250/226
8,233,158 B2 * 7/2012  Zettler et al. .................. 356/630
8,339,617 B2   12/2012 Yamada et al.
2009/0066953 A1  3/2009 Horie
2011/0032541 A1  2/2011 Yamada et al.

FOREIGN PATENT DOCUMENTS

| EP | 2 309 222 A1 | 4/2011 |
|---|---|---|
| JP | 2973803 A | 9/1999 |
| JP | 2000-065536 A | 3/2000 |
| JP | 2001-284424 A | 10/2001 |
| JP | 3532165 B2 | 3/2004 |
| JP | 2009-68937 A | 4/2009 |
| JP | 4482618 B2 | 3/2010 |

OTHER PUBLICATIONS

International Search Report mailed Jun. 21, 2011 issued in corresponding International Application No. PCT/JP2011/002163.

* cited by examiner

*Primary Examiner* — Roy M Punnoose
(74) *Attorney, Agent, or Firm* — Squire Sanders (US) LLP

(57) ABSTRACT

A film thickness measuring device includes a spectroscopic sensor and a data processor, wherein the spectroscopic sensor measures spectroscopic data of a film coated on a substrate and the data processor obtains measured color characteristic variables from the measured spectroscopic data, compares the measured color characteristic variables with plural sets of theoretical color characteristic variables corresponding to plural sets of values, each set including one of plural values of thickness and one of plural values of index of refraction of the film, determines index of refraction of the film using the set of values corresponding to the set of theoretical color characteristic variables which minimizes a difference between the set of theoretical color characteristic variables and the measured color characteristic variables, and determines thickness of the film using the index of refraction of the film.

8 Claims, 23 Drawing Sheets

FIG. 12

TABLE 3

| | |
|---|---|
| n(1) | $\Sigma \Delta W.min(I,J)$ : SAMPLE 1~10 |
| n(2) | $\Sigma \Delta W.min(I,J)$ : SAMPLE 1~10 |
| n(3) | $\Sigma \Delta W.min(I,J)$ : SAMPLE 1~10 |
| n(4) | $\Sigma \Delta W.min(I,J)$ : SAMPLE 1~10 |
| n(5) | $\Sigma \Delta W.min(I,J)$ : SAMPLE 1~10 |
| n(6) | $\Sigma \Delta W.min(I,J)$ : SAMPLE 1~10 |
| n(7) | $\Sigma \Delta W.min(I,J)$ : SAMPLE 1~10 |
| n(8) | $\Sigma \Delta W.min(I,J)$ : SAMPLE 1~10 |
| n(9) | $\Sigma \Delta W.min(I,J)$ : SAMPLE 1~10 |
| n(10) | $\Sigma \Delta W.min(I,J)$ : SAMPLE 1~10 |

FILM THICKNESS MEASURING DEVICE AND FILM THICKNESS MEASURING METHOD

CROSS REFERENCE TO RELATED APPLICATIONS

This application is a continuation of International Patent Application No. PCT/JP2011/002163 filed Apr. 12, 2011. The contents of this application is hereby incorporated by reference.

TECHNICAL FIELD

The present invention relates to a film thickness measuring device and a film thickness measuring method for obtaining a thickness of a film formed on a substrate by measuring spectral reflectivity.

BACKGROUND ART

As devices for measuring a thickness of a film formed on a substrate, there exist an ellipsometer (Patent Document 1, for example) and a measuring device in which a film thickness is obtained from the wavelength which shows maximum or minimum in spectral reflectivity (which is hereinafter referred to as a PV (Peak-Valley) device) (Patent Document 2, for example).

The ellipsometer is widely used for measurement of a thin film thickness in the field of manufacturing semiconductors. However, the ellipsometer has the following problems. Since the projection angle and the receiving angle are large, the ellipsometer can hardly be used in a process in which a distance to the object will change. Since optical elements both on the projection and receiving sides have to be rotated for measurement, the optical system is complicated and expensive.

Since, in the PV device, a film thickness is obtained from the wavelength which shows maximum or minimum in spectral reflectivity, it is necessary that the wavelength which shows maximum or minimum in spectral reflectivity exists. However, in general, in spectral reflectivity data of thin films, thickness of which is 500 nm or less, the wavelength which clearly shows maximum or minimum will not exist. Accordingly, the conventional PV device cannot be used for measurement of thin films, thickness of which is 500 nm or less.

Under the situation, the inventors of the present application and others have developed a device and a method which use theoretical values of characteristic variable of color in order to measure thickness of thin films which is 500 nm or less (Patent Document 3). In this method, however, refractive index of a film is determined based on an estimated value of thickness of a sample film, and therefore the application area is limited.

Thus, a film thickness device of a simple structure and a film thickness method which can be widely used for measurement of thickness of thin films including those, thickness of which is 500 nm or less have not been developed.

Thus, there is a need for a film thickness measuring device of a simple structure and a film thickness measuring method which can be widely used for measurement of thickness of thin films including those, thickness of which is 500 nm or less.

PATENT DOCUMENTS

Patent Document 1: Japanese Patent Application Laid Open No. 2009-68937
Patent Document 2: Japanese Patent No. 3532165
Patent Document 3: Japanese Patent No. 4482618

SUMMARY OF INVENTION

A film thickness measuring device according to the present invention includes a spectroscopic sensor and a data processor, wherein the spectroscopic sensor measures spectroscopic data of a film coated on a substrate and the data processor obtains measured color characteristic variables from the measured spectroscopic data, compares the measured color characteristic variables with plural sets of theoretical color characteristic variables corresponding to plural sets of values, each set including one of plural values of thickness and one of plural values of index of refraction of the film, determines index of refraction of the film using the set of values corresponding to the set of theoretical color characteristic variables which minimizes a difference between the set of theoretical color characteristic variables and the measured color characteristic variables, and determines thickness of the film using the index of refraction of the film.

By the film thickness measuring device according to the present invention, index of refraction of a film coated on a substrate can be determined using measured color characteristic variables obtained from spectroscopic data of the film coated on the substrate and plural sets of theoretical color characteristic variables obtained for plural sets of values of thickness and index of refraction of the film. As a result, thickness of the film can be obtained with a high accuracy using the index of refraction. Accordingly, the film thickness measuring device according to the present invention can be widely used for measurement of thickness of thin films including those, thickness of which is 500 nm or less. Further, the measuring section of the film thickness measuring device according to the present invention has a simple structure.

In a film thickness measuring device according to an embodiment of the present invention, the spectroscopic sensor measures transmittance distribution of the film coated on the substrate and the data processor obtains reflectance distribution from the measured transmittance distribution and then obtains the measured color characteristic variables.

The film thickness measuring device according to the present embodiment measures transmittance distribution of the film coated on the substrate and obtains reflectance distribution of the film coated on the substrate from the measured transmittance distribution. Accordingly, even when a surface of the substrate on which the film is coated is tilted relative to a reference plane, a change in reflectance due to the tilt relative to the reference plane is smaller than a change in reflectance which has been obtained by measuring reflectance distribution of the film. As a result, thickness of the film can be measured with a high accuracy.

A film thickness measuring device according to another embodiment of the present invention further includes a memory storing the plural sets of theoretical color characteristic variables obtained for the plural sets of values of thickness and index of refraction of the film.

In film thickness measuring device according to the present embodiment, index of refraction can be obtained with facility and within a short time using measured color characteristic variables obtained from spectroscopic data of the film coated on the substrate and the plural sets of theoretical color characteristic variables corresponding the plural sets of values of thickness and index of refraction of the film, which are stored in the memory.

In a film thickness measuring device according to another embodiment of the present invention, color characteristic variables are tristimulus values of reflection color.

A film thickness measuring method according to the present invention is a method by which thickness of a film coated on a substrate is measured by a film thickness measuring device including a spectroscopic sensor and a data processor. The method includes the steps of: measuring by the spectroscopic sensor spectroscopic data of the film coated on the substrate; obtaining by the data processor measured color characteristic variables from the measured spectroscopic data; comparing the measured color characteristic variables with plural sets of theoretical color characteristic variables corresponding to plural sets of values, each set including one of plural values of thickness and one of plural values of index of refraction of the film, and determining index of refraction of the film using the set of values corresponding to the set of theoretical color characteristic variables which minimizes a difference between the set of theoretical color characteristic variables and the measured color characteristic variables; and determining thickness of the film using the index of refraction of the film.

By the film thickness measuring method according to the present invention, index of refraction of a film coated on a substrate can be determined using measured color characteristic variables obtained from spectroscopic data of the film coated on the substrate and plural sets of theoretical color characteristic variables obtained for plural sets of values of thickness and index of refraction of the film. As a result, thickness of the film can be obtained with a high accuracy using the index of refraction. Accordingly, the film thickness measuring device according to the present invention can be widely used for measurement of thickness of thin films including those, thickness of which is 500 nm or less.

In a film thickness measuring method according an embodiment of the present invention, in the step of measuring the spectroscopic sensor measures a transmittance distribution of the film coated on the substrate and in the step of obtaining the measured color characteristic variables the data processor obtains a reflectance distribution from the measured transmittance distribution and further obtains the measured color characteristic variables from the reflectance distribution.

In the film thickness measuring method according to the present embodiment, transmittance distribution of the film coated on the substrate is measured and reflectance distribution is obtained from the measured transmittance distribution. Accordingly, even when a surface of the substrate on which the film is coated is tilted relative to a reference plane, a change in reflectance due to the tilt relative to the reference plane is smaller than a change in reflectance which has been obtained by measuring reflectance distribution of the film. As a result, thickness of the film can be measured with a high accuracy.

In a film thickness measuring method according another embodiment of the present invention, in the step of measuring the spectroscopic sensor the spectroscopic sensor measures spectroscopic data of the film coated on the substrate at plural points, in the step of obtaining the measured color characteristic variables the data processor obtains plural sets of measured color characteristic variables which correspond to the plural points and in the step of determining index of refraction the data processor obtains index of refraction of the film using the plural sets of measured color characteristic variables.

In the film thickness measuring method according to the present embodiment, spectroscopic data of the film coated on the substrate are measured at plural points, plural sets of measured color characteristic variables are obtained from transmittance distributions of the plural points, and index of refraction of the film is obtained using the plural sets of measured color characteristic variables. Accordingly, index of refraction of the film can be determined with a higher accuracy.

In a film thickness measuring method according to another embodiment of the present invention, color characteristic variables are tristimulus values of reflection color.

BRIEF DESCRIPTION OF THE DRAWINGS

FIG. 12 shows construction of Table 3 in which the sum of the m values of differences is given for each of the m values of index of refraction n(1) to n(m);

DESCRIPTION OF THE EMBODIMENTS

Figure 1:
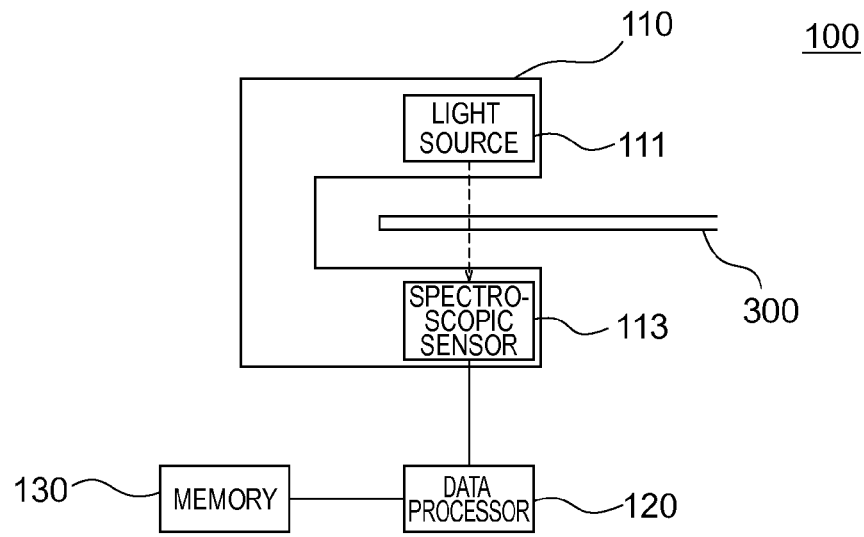
FIG. 1 shows a configuration of a film thickness measuring device according to an embodiment of the present invention.

FIG. 1 shows a configuration of a film thickness measuring device 100 according to an embodiment of the present invention. The film thickness measuring device 100 includes a measuring section 110, a data processor 120 and a memory 130. The measuring section 110 is of C-frame and includes a light source 111 and a spectroscopic sensor 113. Lights emitted by the light source 111 pass through a measuring object 300 and are received by the spectroscopic sensor 113. The spectroscopic sensor 113 measures spectral transmission factor (transmittance distribution against wavelength) of the measuring object 300. The measuring object 300 is a thin film formed on a transparent substrate. Data obtained by measurement of the spectroscopic sensor 113 are sent to the data processor 120. The data processor 120 obtains thickness of the thin film which is the measuring object 300 using the data obtained by measurement of the spectroscopic sensor 113 and data stored in the memory 130.

Figure 2:
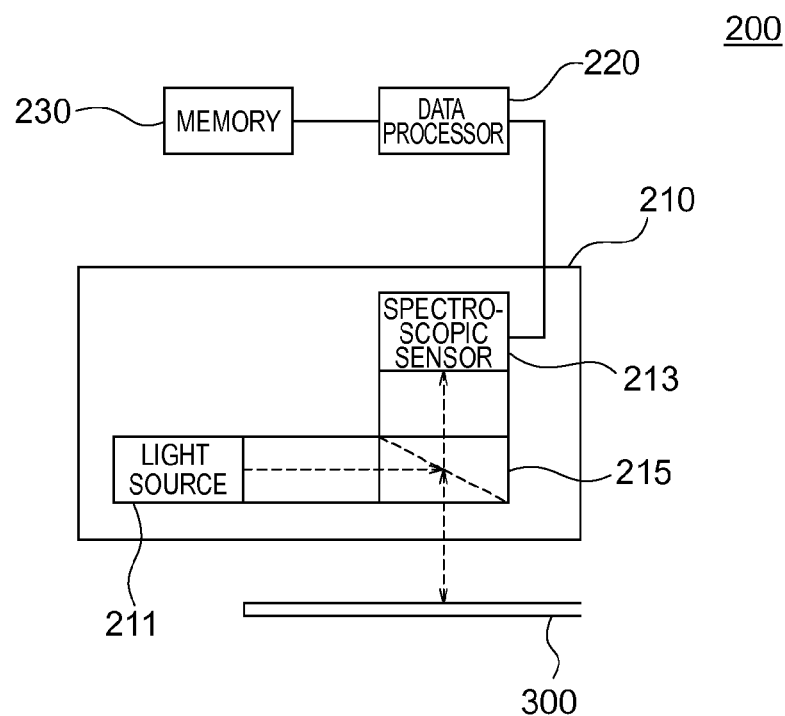
FIG. 2 shows a configuration of a film thickness measuring device according to another embodiment of the present invention.

FIG. 2 shows a configuration of a film thickness measuring device 200 according to another embodiment of the present invention. The film thickness measuring device 200 includes a measuring section 210, a data processor 220 and a memory 230. The measuring section 210 includes a light source 211, a beam splitter 215 and a spectroscopic sensor 213.

Lights from the light source 211 are reflected by the beam splitter 215 and reach the measuring object 300. The measuring section 210 is arranged such that lights illuminating the measuring surface of the measuring object 300 are incident perpendicularly on the measuring surface. The lights illuminating the measuring surface are reflected in the direction which is perpendicular to the measuring surface, travel in the opposite direction along the path of the lights illuminating the measuring surface, reach the beam splitter 215, pass through the beam splitter 215 and are received by the spectroscopic sensor 213. The spectroscopic sensor 213 measures spectral reflection factor of the measuring object 300. The measuring object 300 is a thin film formed on a transparent or an opaque substrate. Data obtained by measurement of the spectroscopic sensor 213 are sent to the data processor 220. The data processor 220 obtains thickness of the thin film which is the measuring object 300 using the data obtained by measurement of the spectroscopic sensor 213 and data previously stored in the memory 230.

The through-beam measuring device shown in FIG. 1 can be used only when the substrate is transparent. Advantages of a through-beam measuring device will be described later.

The light sources 111 and 211 may be ones in which an ultraviolet LED light source emitting light having the peak at 430 nm and a white color LED light source emitting light having the peak around 580 nm are used.

The spectroscopic sensors 113 and 213 may be ones in which a transmission wavelength variable filter and an image sensor are combined. The transmission wavelength variable filter is one type of interference filters in which a pass band between the shortest wavelength and the longest wavelength of the white light having entered the filter varies continuously or stepwisely depending on a position of a point on the filter thorough which the light passes. Such spectroscopic sensors are disclosed in Japanese Patent No. 3618090.

Operation of the data processors 120 and 220 will be described in detail below.

Figure 3:
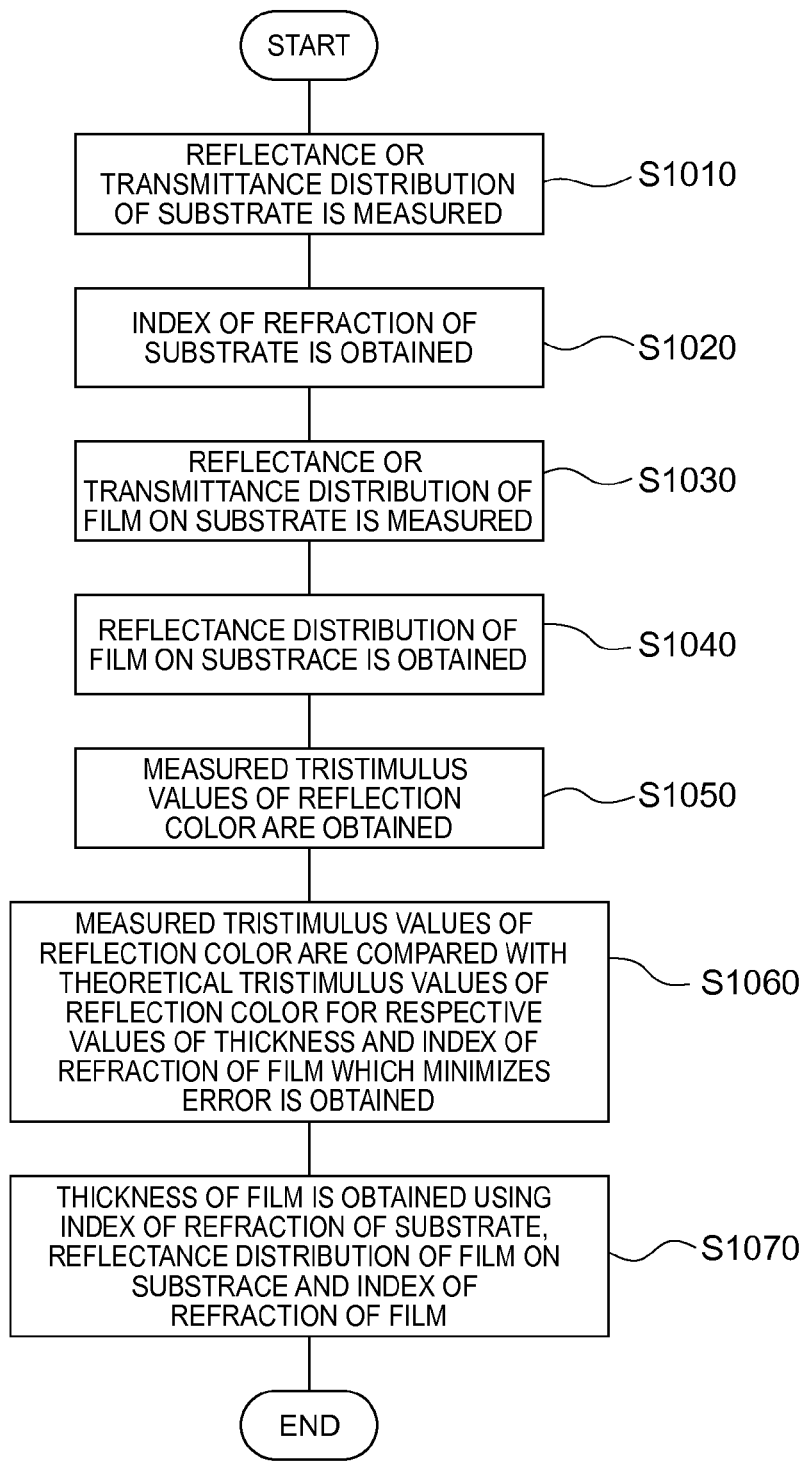
FIG. 3 is a flowchart for illustrating operation of the data processors.

FIG. 3 is a flowchart for illustrating operation of the data processors 120 and 220.

In step S1010 of FIG. 3, the spectroscopic sensor 113 measures spectral transmission factor, that is transmittance distribution against wavelength, of the substrate. The spectroscopic sensor 213 measures spectral reflection factor, that is reflectance distribution against wavelength, of the substrate.

In step S1020 of FIG. 3, the data processor 120 receives data of transmittance distribution against wavelength from the spectroscopic sensor 113 and obtains data of reflectance distribution against wavelength of the substrate by the following equation.

$$Rv \cdot cal = 100 - \tau (\%)$$

In the above-described equation, Rv·cal represents reflectance which is calculated from transmittance while $\tau$ represents measured transmittance. Unit of reflectance and transmittance is percentage. The data processor 220 receives data of reflectance distribution against wavelength of the substrate from the spectroscopic sensor 213.

A relationship between refractive index and reflectance of a substrate will be described.

Figure 6:
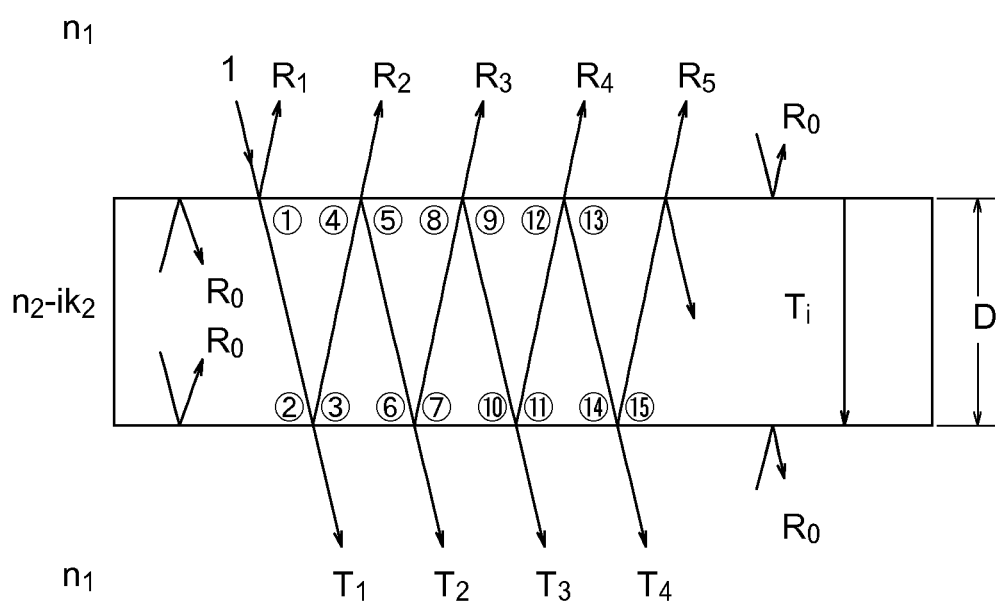
FIG. 6 shows a model on multipath reflection of a substrate.

FIG. 6 shows a model on multipath reflection of a substrate. Although light is incident perpendicularly on a surface of the substrate in fact, in FIG. 6 the light is represented to be incident on the surface at an angle for the sake of convenience.

Thickness D of the substrate is assumed to be sufficiently large in comparison with wavelength of the incident light. In this case internal transmittance Ti of the substrate must be considered. Internal transmittance is given by the following equation according to Lambert law.

$$T_i = \exp(-\alpha D) = \exp(-4\pi k_2 D / \lambda) \quad (1)$$

$\alpha$ represents a constant, $k_2$ represents attenuation coefficient and $\lambda$ represents wavelength. When multipath reflection on the top surface and the bottom surface of the substrate is considered as shown in FIG. 6, reflectance R and transmittance T are expressed by the following equations as sums of geometric progressions.

$$R = R_0\{1+(1-2R_0)Ti^2\}/(1-Ti^2R_0^2) \quad (2)$$

$$T = (1-R_0)^2 Ti/(1-Ti^2R_0^2) \quad (3)$$

where $$R_0 = \{(n_1-n_2)^2+k_2^2\}/\{(n_1+n_2)^2+k_2^2\} \quad (4)$$

Complex index of refraction of the substrate is represented as $n_2 - ik_2$.

When there exists no absorption of the substrate, Ti=1 and $k_2=0$ in Equation (3) and Equation (4), and therefore the following equations hold.

$$R = 2R_0/(1+R_0) \quad (5)$$

$$T = (1-R_0)/(1+R_0) \quad (6)$$

where $$R_0 = \{(n_1-n_2)/(n_1+n_2)\}^2 \quad (7)$$

$n_1$ represents index of refraction of medium surrounding the substrate.

Using Equations (5) and (7), a relationship between index of refraction $n_2$ and reflectance R of the substrate can be obtained.

Figure 7:
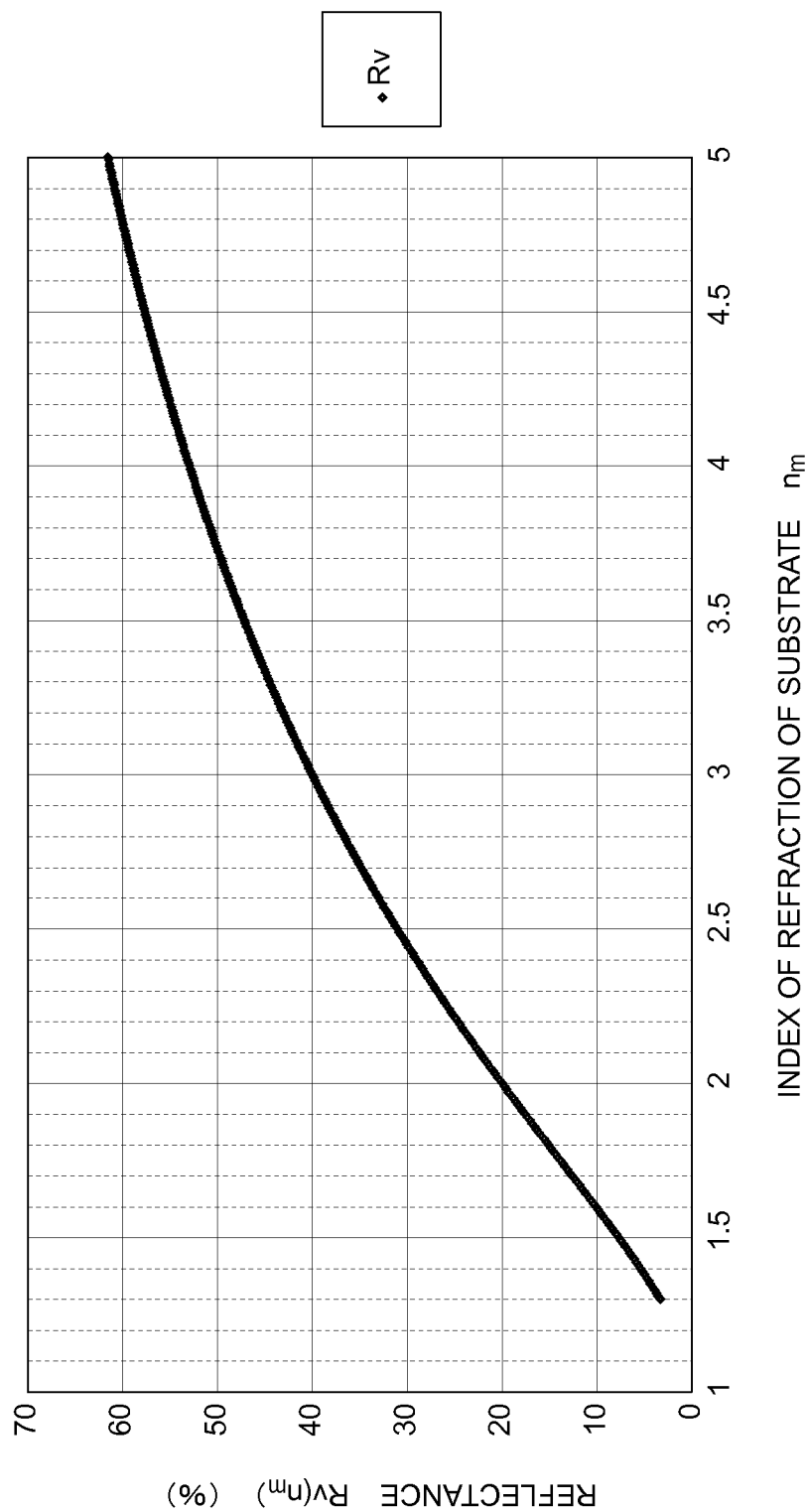
FIG. 7 shows a relationship between index of refraction $n_m$ and normal-incidence reflectance $Rv(n_m)$ of the substrate.

FIG. 7 shows a relationship between index of refraction $n_m$ and normal-incidence reflectance $Rv(n_m)$ of the substrate.

The data processors 120 and 220 obtain a value of reflectance corresponding to wavelength of 550 nm from the data of reflectance distribution of the substrate and then obtain index of refraction $n_m$ of the substrate using FIG. 7 on the assumption that the above-described reflectance is normal-incidence reflectance $Rv(n_m)$.

In step S1030 of FIG. 3, the spectroscopic sensor 113 measures spectral transmission factor, that is transmittance distribution against wavelength, of the measuring object which is a thin film formed on the substrate. The spectroscopic sensor 213 measures spectral reflection factor, that is reflectance (Rv) distribution against wavelength, of the measuring object which is a thin film formed on the substrate In step S1040 of FIG. 3, the data processor 120 obtains data of reflectance (Rv·cal) distribution by calculation based on data of the measured transmittance distribution as in the process of step S1020. The data processors 120 and 220 obtain corrected reflectance distribution of the measuring object which is a thin film formed on the substrate. Corrected reflectance distributions are obtained for m (m is an integer which is 1 or more) points on the measuring object which is a thin film formed on the substrate.

Figure 4:
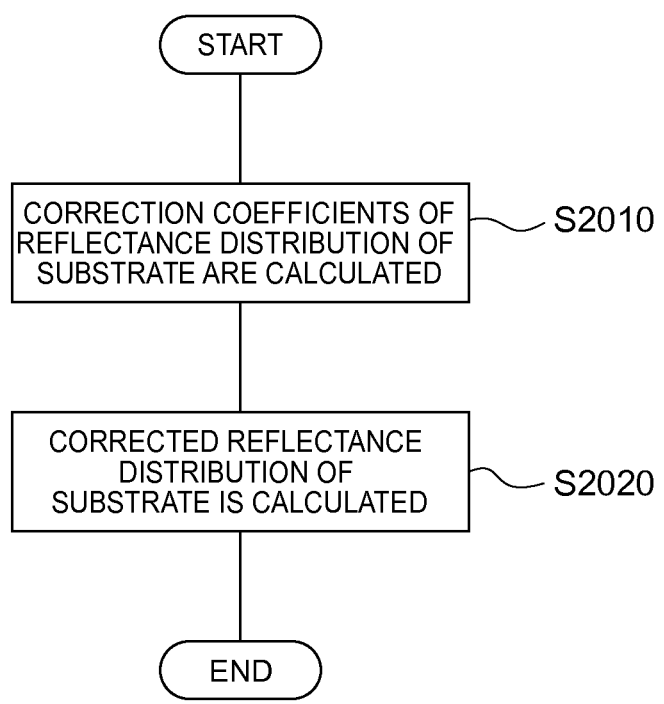
FIG. 4 is a flowchart showing how to obtain corrected reflectance distribution of the measuring object which is a thin film formed on the substrate.

FIG. 4 is a flowchart showing how to obtain corrected reflectance distribution of the measuring object which is a thin film formed on the substrate.

In step S2010 of FIG. 4, the data processors 120 and 220 respectively obtain correction coefficients $k_1$ and $k_2$ for reflectance. Correction coefficients $k_1$ and $k_2$ for reflectance are determined by the following equations such that reflectance Rv·cal and reflectance Rv are equal to that at wavelength of 550 nm independently of wavelength.

$$K1(\lambda) = Rv\cdot\text{cal}(550\,\text{nm})/Rv\cdot\text{cal}(\lambda) \quad (8)$$

$$K2(\lambda) = Rv(550\,\text{nm})/Rv(\lambda) \quad (9)$$

In step S2020 of FIG. 4, the data processor 120 calculates corrected reflectance Rvc by the following equation using reflectance Rv·cal obtained from measured transmittance.

$$Rvc = Rv\cdot\text{cal}(\lambda)\cdot K1(\lambda) \quad (10)$$

The data processor 220 calculates corrected reflectance Rvc by the following equation using measured reflectance Rv.

$$Rvc = Rv(\lambda)\cdot K2(\lambda) \quad (11)$$

In step S1050 of FIG. 3, the data processors 120 and 220 calculate m sets of tristimulus values of reflection color using m values of corrected reflectance Rvc. A method for calculating tristimulus values of reflection color is described in detail in "JIS Z8722 Methods of color measurement—Reflecting and transmitting objects". Tristimulus values of reflection color thus obtained are referred to as measured tristimulus values of reflection color. In the present embodiment, tristimulus values of reflection color are used. Alternatively, a color value representation method based on tristimulus values of reflection color (for example, L*, a*, b*) can also be used. In the text of specification and claims, variables representing characteristics of color such as tristimulus values of reflection color, are referred to as color characteristic variables. Further, color characteristic variables which have been calculated from corrected reflectance obtained by measurement are referred to as measured color characteristic variables.

In step S1060 of FIG. 3, the data processors 120 and 220 compare measured tristimulus values of reflection color which have been obtained in step S1050 with sets of theoretical tristimulus values of reflection color which have been previously obtained for respective values of thickness and index of refraction of a film and obtain the index of refraction of the film which minimizes error.

If thickness of a film is in the rage from 1 to 200 nanometers, a phenomenon called "metamerism" in which sets of tristimulus values are substantially identical with each other even though reflectance distributions are different from each other will not take place, and therefore a relationship will hold, in which when one of reflectance distribution and a set of tristimulus values of reflection color is determined, the other is determined. Accordingly, index of refraction of a film can be uniquely determined using tristimulus values of reflection color.

Figure 5:
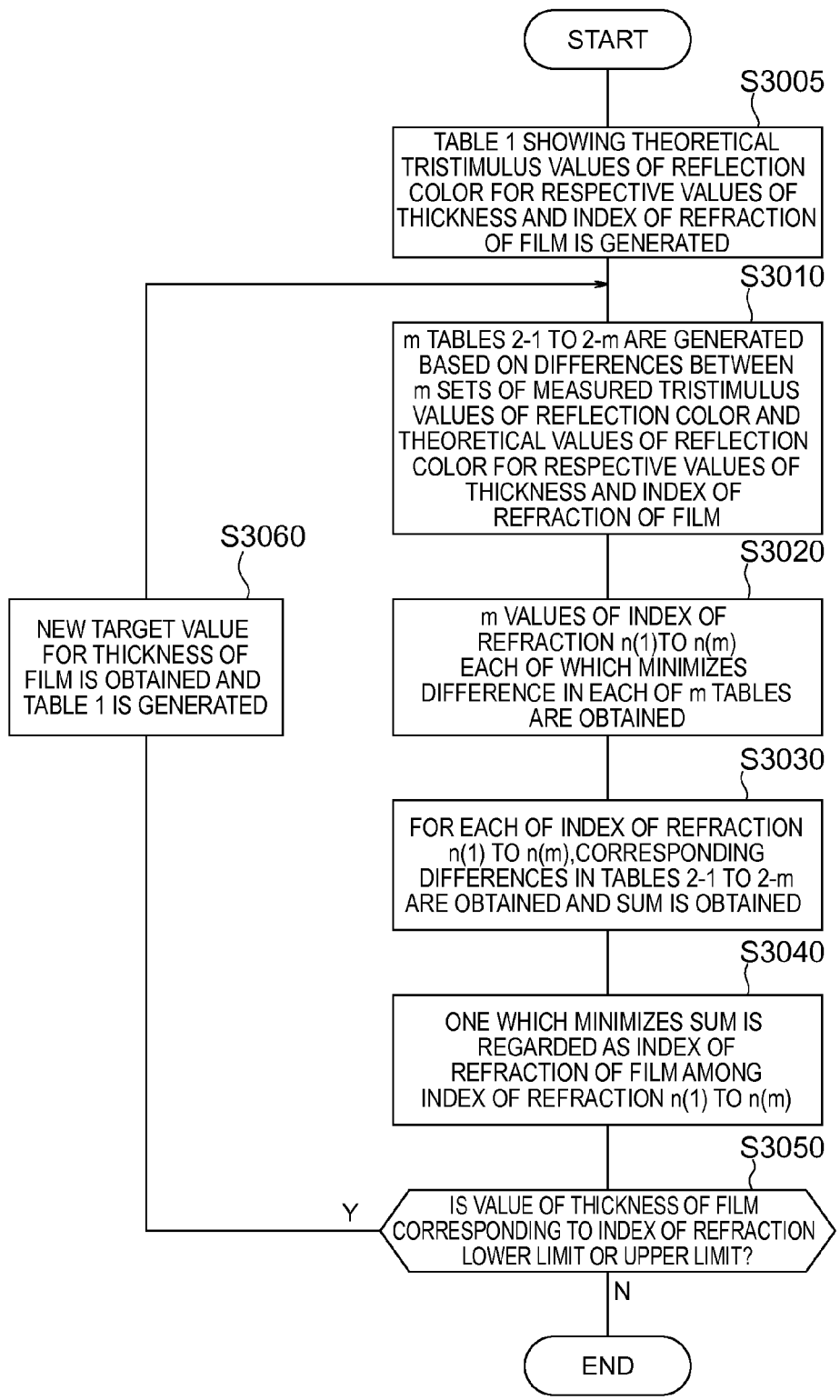
FIG. 5 is a flowchart showing the process of step S1060 of FIG. 3 in detail.

FIG. 5 is a flowchart showing the process of step S1060 of FIG. 3 in detail.

In step S3005 of FIG. 5, the data processors 120 and 22 calculate sets of theoretical tristimulus values of reflection color for respective values of thickness and index of refraction of a film, generate a table (Table 1) of the sets of theoretical tristimulus values of reflection color for respective values of thickness and index of refraction of the film and previously store the table in the memory 130 and the memory 230, respectively.

A relationship between reflectance and a set of index of refraction of a substrate, index of refraction of a film coated on the substrate and thickness of the film will be described below. Using the relationship, theoretical reflectance distribution is calculated and then using the theoretical reflectance distribution theoretical tristimulus values of reflection color are calculated.

Figure 8:
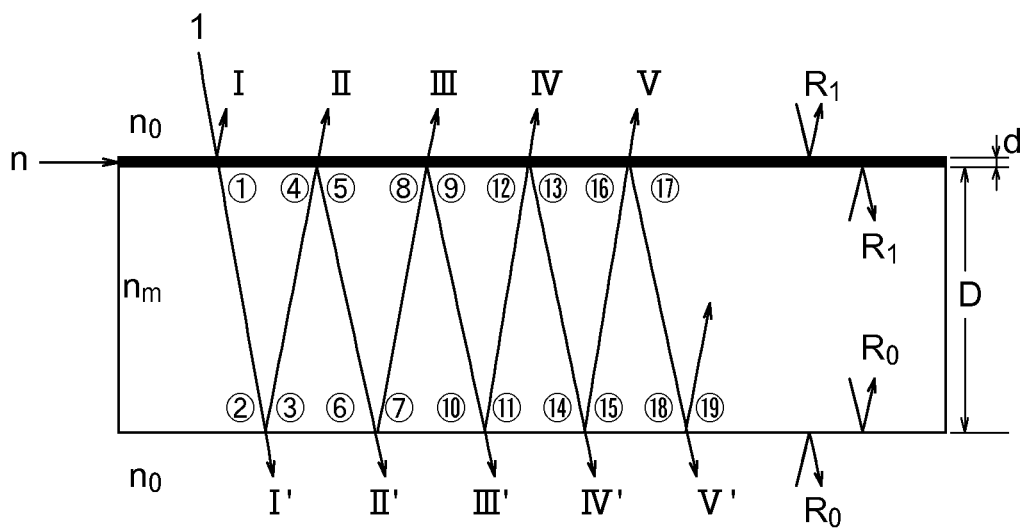
FIG. 8 shows a model on multipath reflection of a substrate (index of refraction of $n_m$, thickness of D) with a transparent thin film (index of refraction of n, thickness of d) formed thereon.

FIG. 8 shows a model on multipath reflection of a substrate (index of refraction of $n_m$, thickness of D) with a transparent thin film (index of refraction of n, thickness of d) formed thereon. Assuming that reflectance of the thin film is $R_1$ and reflectance of the substrate is $R_0$, the following equation holds.

$$R=(R_0+R_1-2R_0R_1)/(1-R_0R_1) \quad (12)$$

where $$R_0=(n_0-n_m)^2/(n_0+n_m)^2 \quad (13)$$

Assuming that $n_0=1.0$ in Equation (13), the following equation holds.

$$R_0=(1-n_m)^2/(1+n_m)^2 \quad (14)$$

When reflection on the bottom surface of the substrate is taken into consideration, reflectance is represented as $Rv \cdot n_m$. Then the following equation holds from Equations (12) and (14).

$$Rv \cdot n_m=(R_0+Rv(d,n,n_m)-2R_0Rv(d,n,n_m))/(1-R_0Rv(d,n,n_m)) \quad (15)$$

Thus reflectance of the substrate (index of refraction of $n_m$, thickness of D) with the transparent thin film (index of refraction of n, thickness of d) formed thereon vary greatly depending on index of refraction $n_m$ of the substrate and index of refraction n and thickness d of the coating mixture (film).

Figure 9:
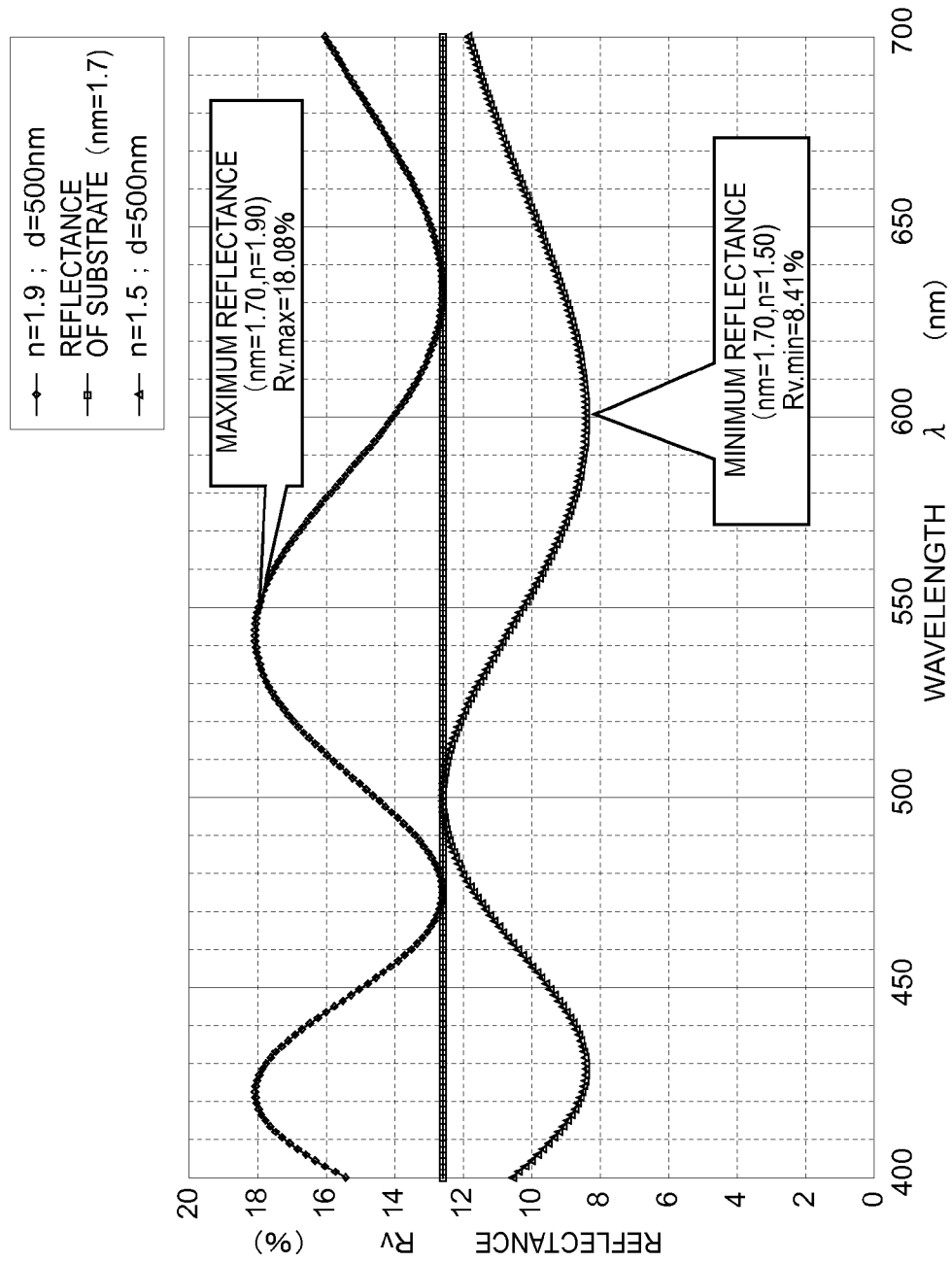
FIG. 9 shows values of reflectance of a substrate ($n_m$=1.70) with coating mixtures (n=1.90 and n=1.50) of d=500 nm coated thereon.

FIG. 9 shows values of reflectance of a substrate ($n_m=1.70$) with coating mixtures (n=1.90 and n=1.50) of d=500 nm coated thereon. The values have been calculated using Equation (15).

When reflectance n of a coating mixture is smaller than reflectance $n_m$ of the substrate, reflectance distribution Rv(n) is smaller than the reflectance of the substrate and the local minimum value (minimum value Rv·min) of Rv(n) is 8.41%. When reflectance n of a coating mixture is greater than reflectance $n_m$ of the substrate, reflectance distribution Rv(n) is greater than the reflectance of the substrate and the local maximum value (maximum value Rv·max) of Rv(n) is 18.08%.

It is assumed that reflectance remain constant independently of wavelength. Accordingly, when thickness of the film is changed, phase alone is changed and the maximum value of reflectance Rv·max and the minimum value of reflectance Rv·min which are calculated using Equation (15) remain unchanged.

Figure 10:
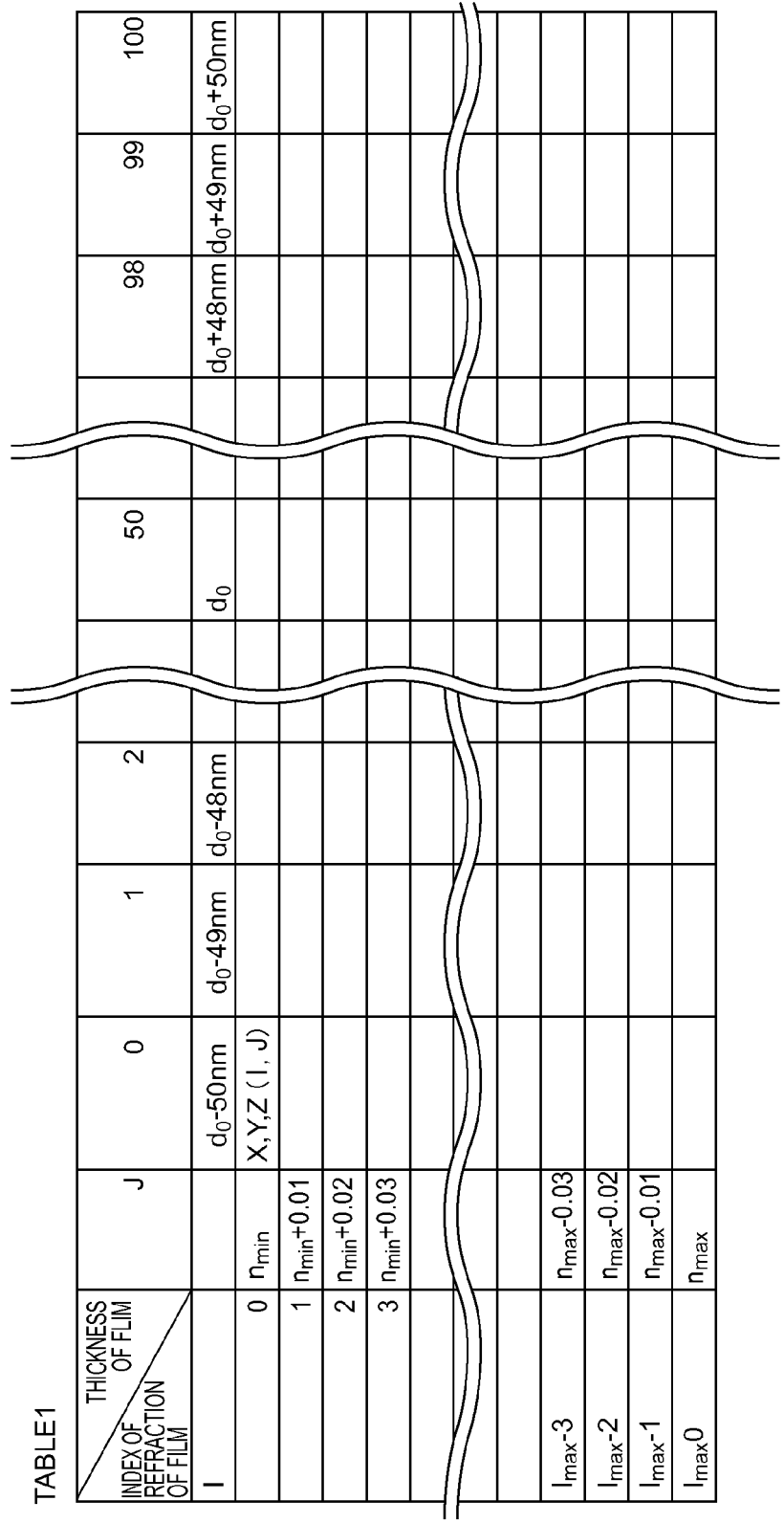
FIG. 10 shows construction of a table (Table 1) of theoretical tristimulus values of reflection color for respective values of thickness and index of refraction of the film.

FIG. 10 shows construction of Table 1. Rows of Table 1 represent values of index of refraction of the film, which are set in increments of 0.01 from the minimum value to the maximum value. Columns of Table 1 represent values of thickness of the film, which are set in increments of 1 nm from d0−50 (nm) to d0+50 (nm). d0 (nm) represents a target value of thickness of the film.

In step S3010 of FIG. 5, the data processors 120 and 220 generate m tables, Table 2-1 to Table 2-m, based on differences between m sets of tristimulus values of reflection color which have been obtained in step S1050 and sets of theoretical tristimulus values of reflection color for respective values of thickness and index of refraction of the film in Table 1.

Figure 11:
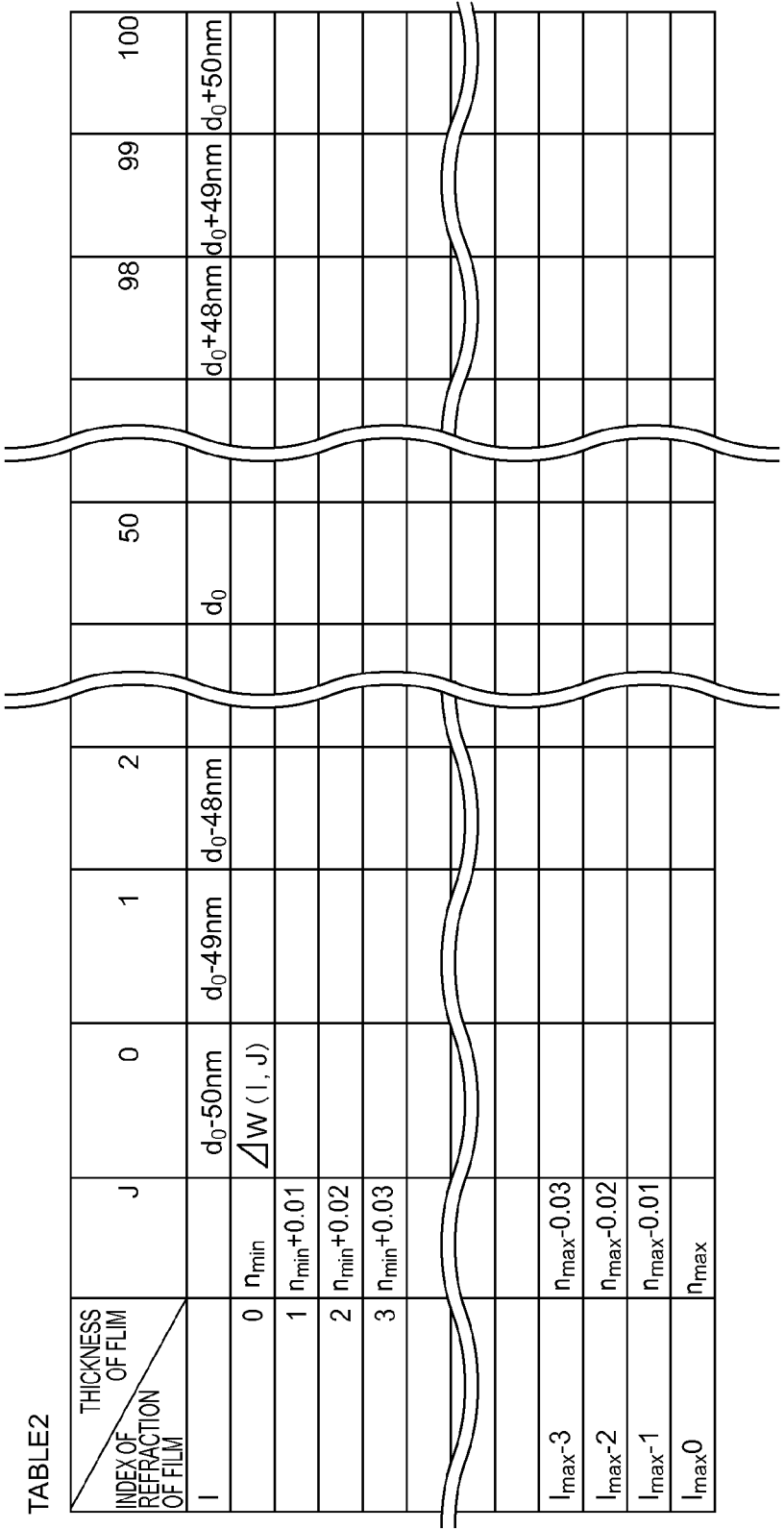
FIG. 11 shows construction of Table 2-1 to Table 2-m which show differences between each of m sets of measured tristimulus values of reflection color and sets of theoretical tristimulus values of reflection color for respective values of thickness and index of refraction of the film in Table 1.

FIG. 11 shows construction of Table 2-1 to Table 2-m which show differences between each of m sets of tristimulus values of reflection color and sets of theoretical tristimulus values of reflection color for respective values of thickness and index of refraction of the film in Table 1. Rows of each table represent values of index of refraction of the film, which are set in increments of 0.01 from the minimum value to the maximum value. Columns of each table represent values of thickness of the film, which are set in increments of 1 nm from d0−50 (nm) to d0+50 (nm). The differences which correspond to values of index of refraction in respective rows and to values of thickness of the film in respective columns, are calculated and stored as Table 2-1 to Table 2-m in the memory 130 or the memory 230.

In step S3020 of FIG. 5, the data processors 120 and 220 obtain m values of index of refraction n(1) to n(m) and m values of thickness of the film d(1) to d(m), each set of which minimizes the difference in each of the m tables.

In step S3030 of FIG. 5, the data processors 120 and 220 obtain m values of differences corresponding to the m values of thickness of the film d(1) to d(m) for each of the m values of index of refraction n(1) to n(m) in each of Tables 2-1 to 2-m, and obtain a sum of the m values of the differences.

FIG. 12 shows construction of Table 3 in which the sum of the values of differences is given for each of the m values of index of refraction n(1) to n(m). Rows of Table 3 represent the m values of index of refraction n(1) to n(m). It is assumed that m is ten (10).

In step S3040 of FIG. 5, the data processors 120 and 220 regard the one which minimizes the sum in Table 3 among the m values of index of refraction n(1) to n(m) as a value of index of refraction of the film.

In step S3050 of FIG. 5, the data processors 120 and 220 determine whether the value of thickness of the film corresponding to the value of index of refraction which has been obtained in step S3040 is the lower limit (d0−50 (nm)) or the upper limit (d0+50 (nm)). If the value is not the lower limit or the upper limit, the process is terminated. If the value is the lower limit or the upper limit, the process goes to step S3060.

In step S3060 of FIG. 5, the data processors 120 and 220 determine a new target value d0 (nm) of thickness of the film and generate Table 1. The new target value is set to a value which is smaller than the lower limit or greater than the upper limit.

In step S1070 of FIG. 3, the data processors 120 and 220 obtain thickness of the film using index of refraction of the substrate which has been obtained in step S1020, reflectance distribution of the film on the substrate which has been obtained in step S1040, and index of refraction of the film which has been obtained in step S1060. A method for obtaining thickness of a film is described in Japanese Patent No. 4482618.

Figure 13:
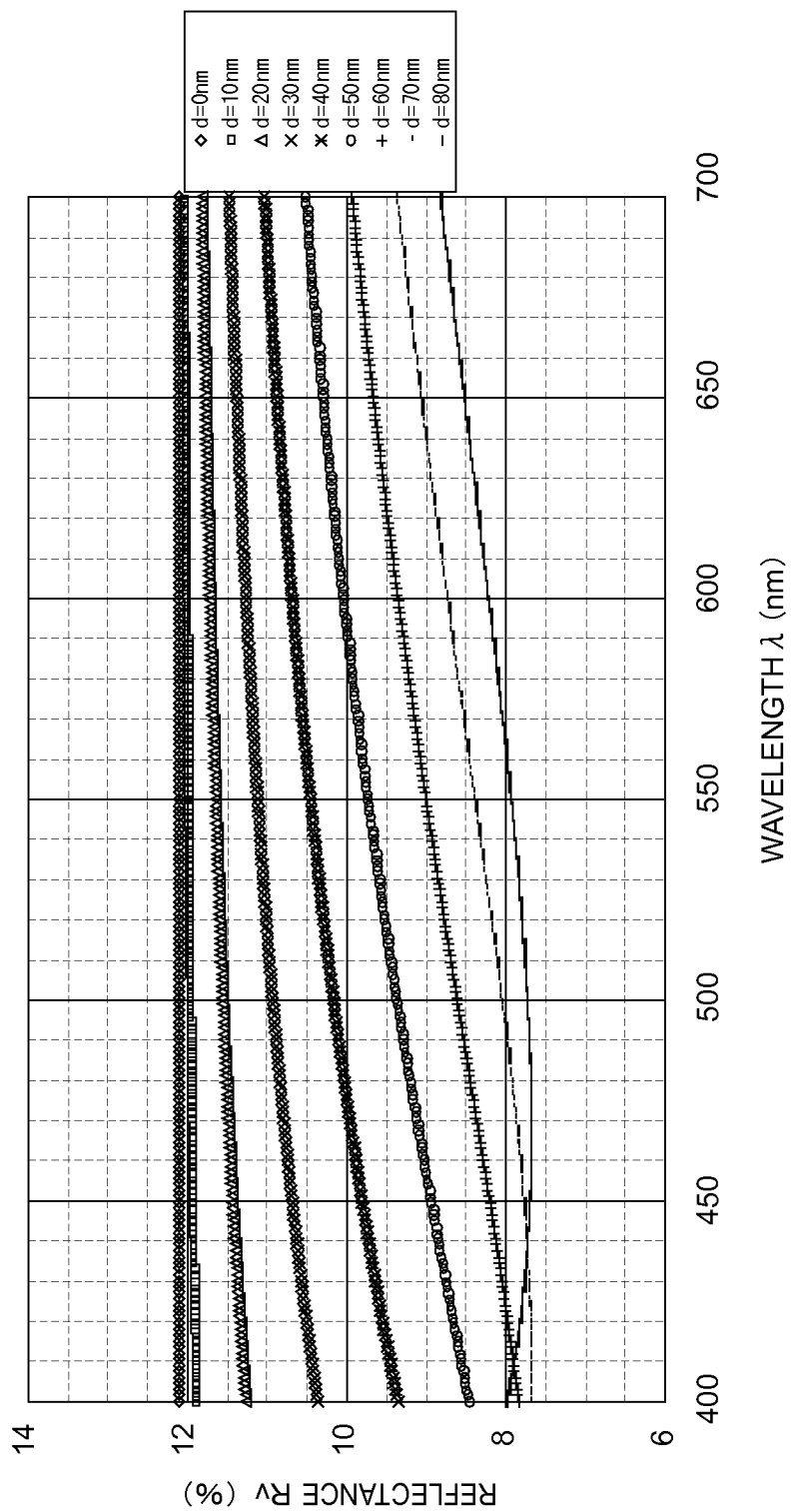
FIG. 13 shows relationships between wavelength and values of theoretical reflectance for respective values of thickness of a film in the case that index of refraction of the thin film is smaller than index of refraction of a substrate.

FIG. 13 shows relationships between wavelength and values of theoretical reflectance for respective values of thickness of a film in the case that index of refraction of the thin film is smaller than index of refraction of a substrate. In FIG. 13, the horizontal axis represents wavelength while the vertical axis represents reflectance. Index of refraction of the substrate and that of the film are as below.

$n_m=1.68$
n=1.46

When thickness of the film is smaller than 70 nm, a minimum value of index of refraction will not appear. Accordingly, thickness of the film cannot be obtained by conventional PV devices.

Figure 14:
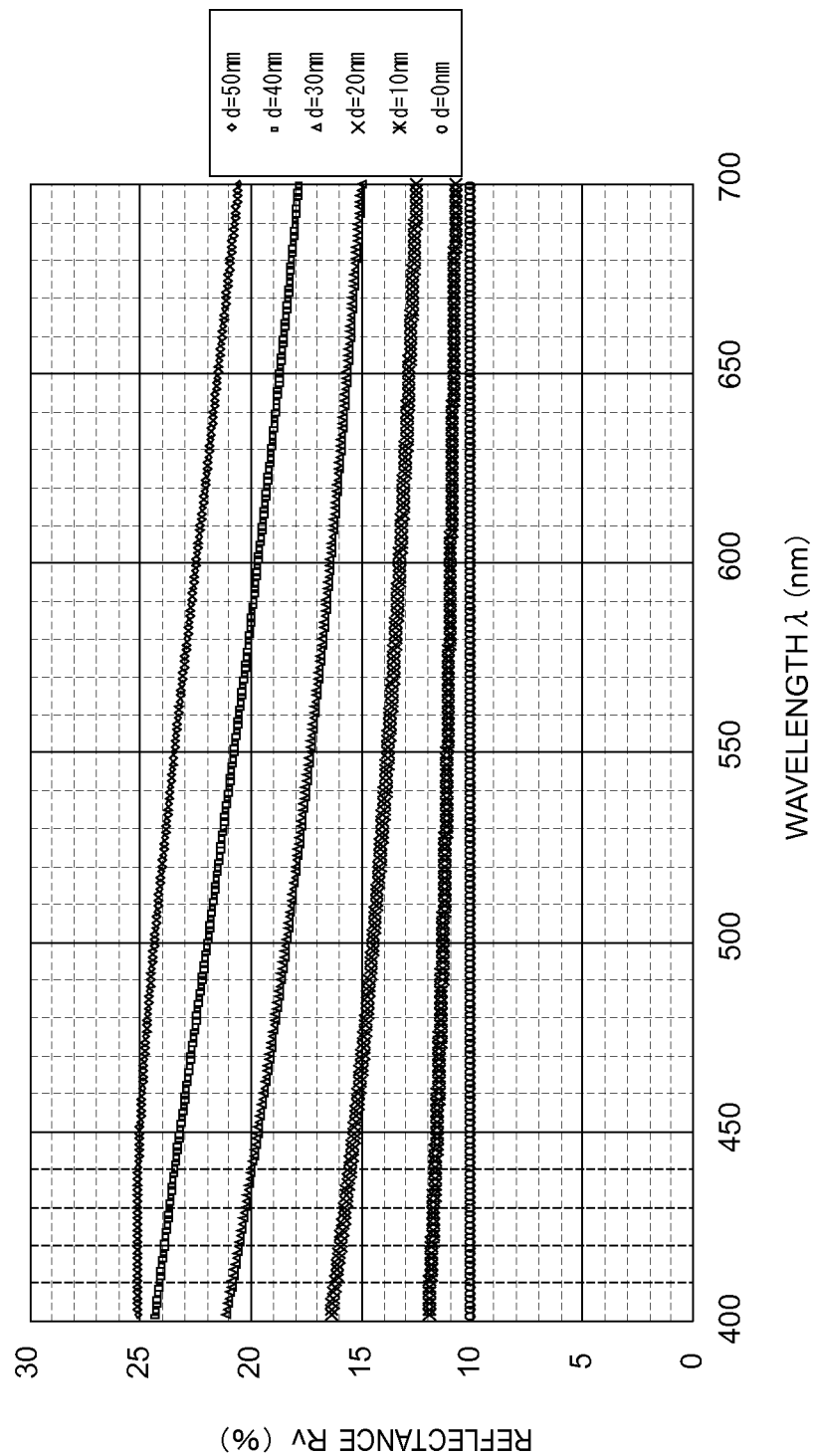
FIG. 14 shows relationships between wavelength and values of theoretical reflectance for respective values of thickness of a film in the case that index of refraction of the thin film is greater than index of refraction of a substrate.

FIG. 14 shows relationships between wavelength and values of theoretical reflectance for respective values of thickness of a film in the case that index of refraction of the thin film is greater than index of refraction of a substrate. In FIG. 14, the horizontal axis represents wavelength while the vertical axis represents reflectance. Index of refraction of the substrate and that of the film are as below.

$n_m=1.60$
n=2.10

When thickness of the film is smaller than 40 nm, a minimum value of index of refraction will not appear. Accordingly, thickness of the film cannot be obtained by conventional PV devices.

Figure 15:
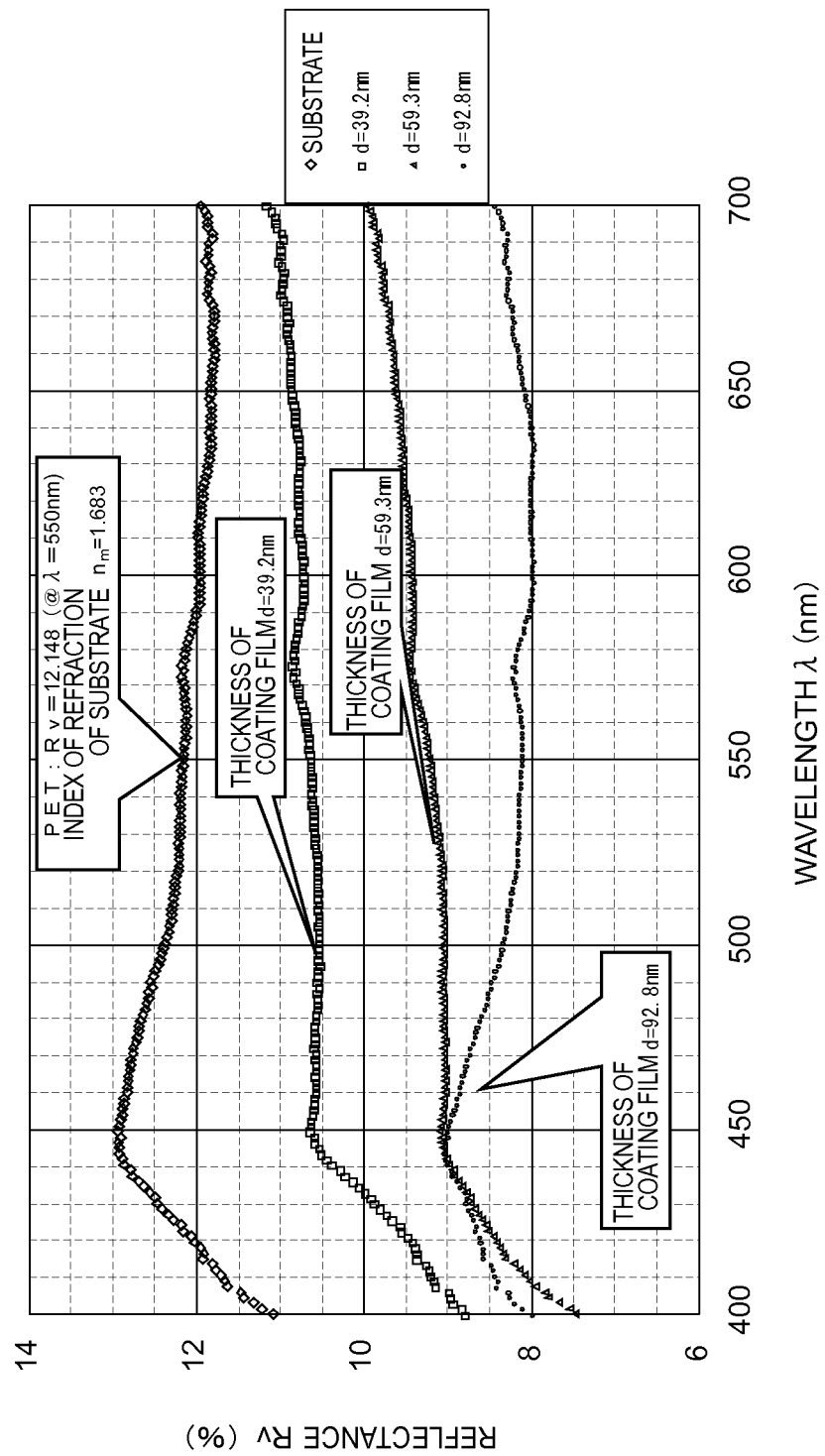
FIG. 15 shows measured reflectance distributions of a substrate of polyethylene terephthalate and inorganic coating films formed on the substrate.

FIG. 15 shows measured reflectance distributions of a substrate of polyethylene terephthalate and inorganic coating films formed on the substrate. In FIG. 15, the horizontal axis represents wavelength while the vertical axis represents reflectance. Index of refraction of the substrate which has been obtained by the method shown in FIG. 3 is 1.683 while that of the films is 1.480. Further, values of thickness of the films which have been obtained using the index of refraction of the films and the three measured reflectance distributions of the films formed on the substrate are 39.2 nm, 59.3 nm and 92.8 nm, respectively. In FIG. 15 values of thickness of the films are marked with "thickness of coating film".

Figure 16:
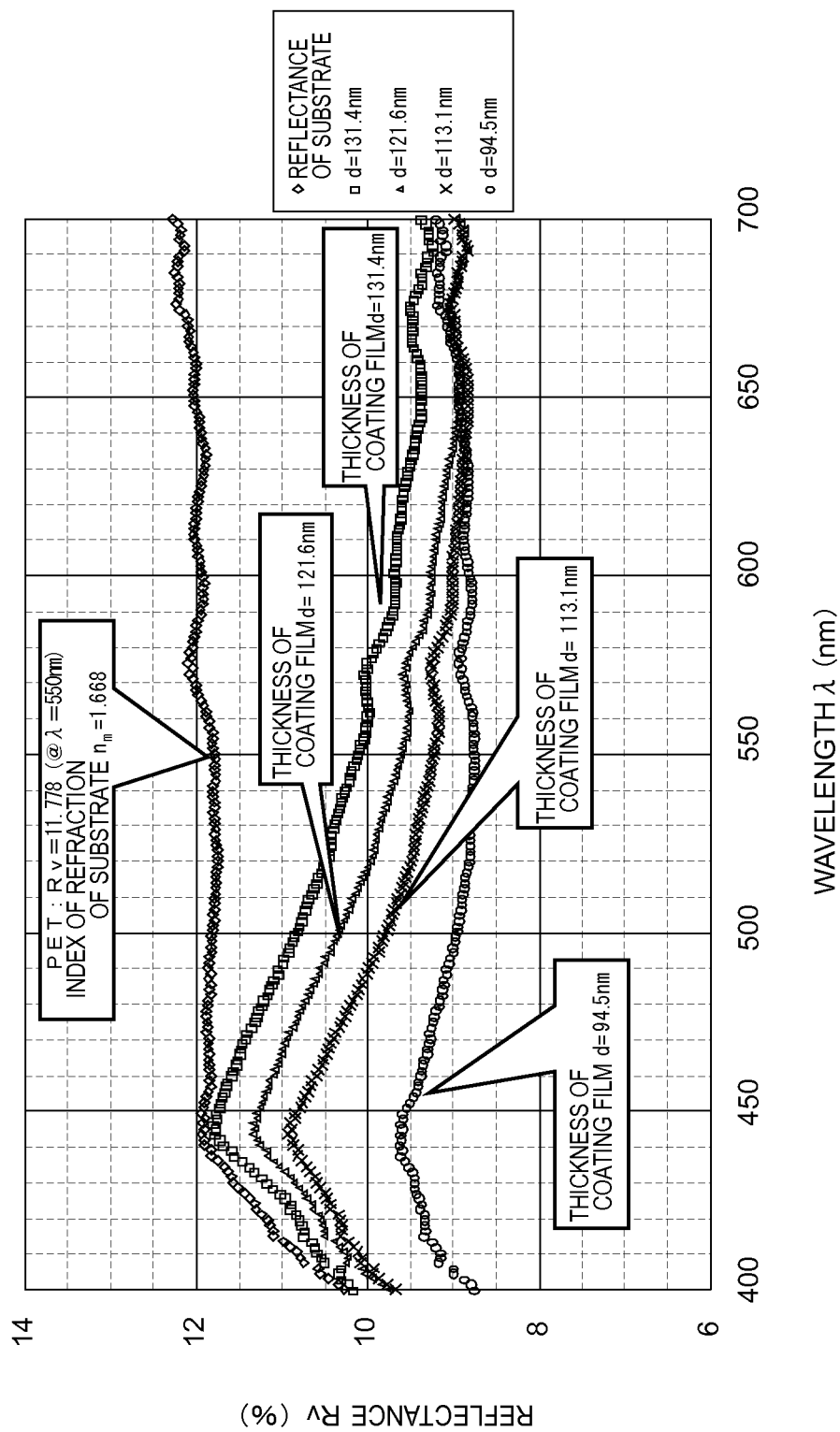
FIG. 16 shows measured reflectance distributions of a substrate of polyethylene terephthalate and inorganic coating films formed on the substrate.

FIG. 16 shows measured reflectance distributions of a substrate of polyethylene terephthalate and inorganic coating films formed on the substrate. In FIG. 16, the horizontal axis represents wavelength while the vertical axis represents reflectance. Index of refraction of the substrate which has been obtained by the method shown in FIG. 3 is 1.668 while that of the films is 1.532. Further, values of thickness of the films which have been obtained using the index of refraction of the films and the four measured reflectance distributions of the films formed on the substrate are 131.4 nm, 121.6 nm, 113.1 nm and 94.5 nm, respectively. In FIG. 16 values of thickness of the films are marked with "thickness of coating film". FIG. 16 shows that a small difference of approximately 10 nm in thickness of films can be adequately detected by the film thickness measuring device and the film thickness measuring method according to the present embodiment.

Figure 17:
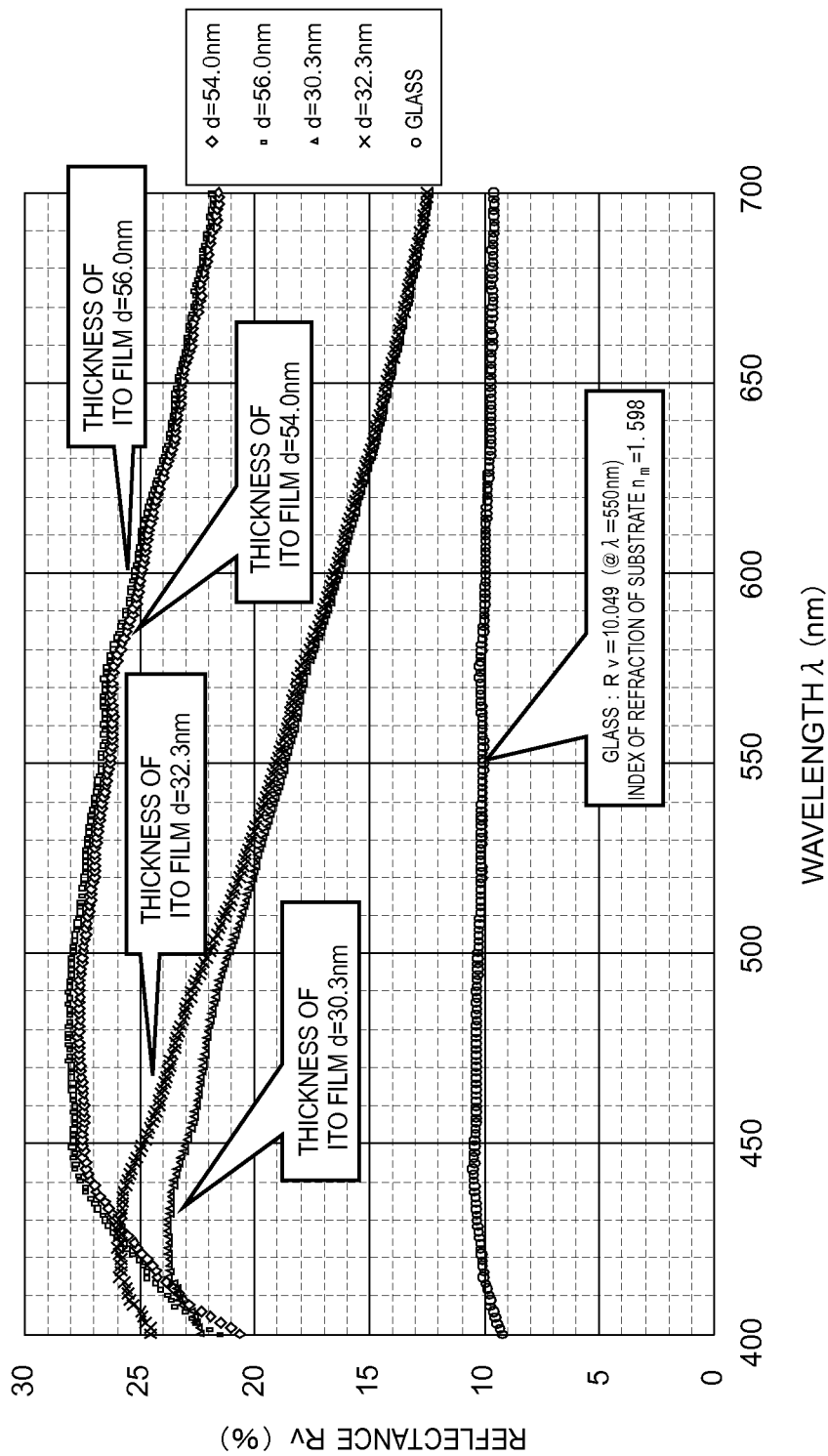
FIG. 17 shows measured reflectance distributions of a substrate of glass and ITO (Indium Tin Oxide) films formed on the substrate.

FIG. 17 shows measured reflectance distributions of a substrate of glass and ITO (Indium Tin Oxide) films formed on the substrate. In FIG. 17, the horizontal axis represents wavelength while the vertical axis represents reflectance. Index of refraction of the substrate which has been obtained by the method shown in FIG. 3 is 1.598 while that of the films is 2.156. Further, values of thickness of the films which have been obtained using the index of refraction of the films and the four measured reflectance distributions of the films formed on the substrate are 56.0 nm, 54.0 nm, 32.3 nm and 30.3 nm, respectively.

Figure 18:
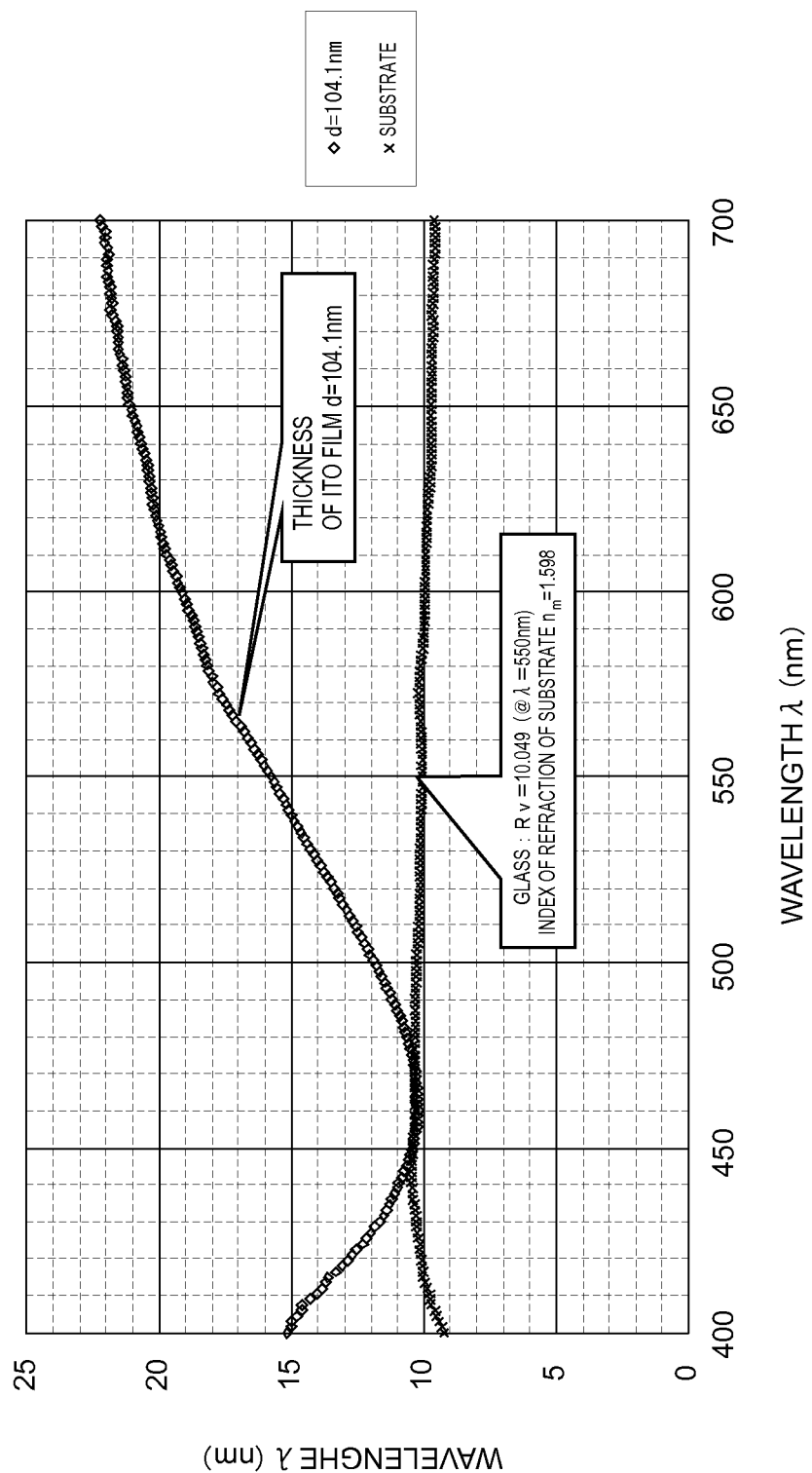
FIG. 18 shows measured reflectance distributions of a substrate of glass and an ITO (Indium Tin Oxide) film formed on the substrate.

FIG. 18 shows measured reflectance distributions of a substrate of glass and an ITO (Indium Tin Oxide) film formed on the substrate. In FIG. 18, the horizontal axis represents wavelength while the vertical axis represents reflectance. Index of refraction of the substrate which has been obtained by the method shown in FIG. 3 is 1.598 while that of the film is 2.194. Further, a value of thickness of the film which has been obtained using the index of refraction of the film and the one measured reflectance distribution of the film formed on the substrate is 104.1 nm.

In FIG. 17 the values of thickness of the films are 56 nm or smaller while in FIG. 18 the value of thickness of the film is 104 nm. Accordingly, the reflectance distributions shown in FIG. 17 are completely different from the reflectance distribution shown in FIG. 18. The values of index of refraction of the films which have been obtained using the completely different reflectance distributions are 2.156 and 2.194. Thus, a ratio of a difference in index of refraction to the values of index of refraction is 2% or smaller. This fact proves a high accuracy of the method according to the present embodiment.

The film thickness measuring devices shown in FIG. 1 and FIG. 2 are constructed such that lights from the light sources 111 and 211 are perpendicularly incident onto the surface of the measuring object 300. A surface which is arranged such that lights from the light sources 111 and 211 are perpendicularly incident onto the surface is defined as a reference plane. Provided that the surface of the measuring object 300 is tilted relative to the reference plane, how an angle of tilt relative to the reference plane affects the transmittance measuring type film thickness measuring device shown in FIG. 1 and the reflectance measuring type film thickness measuring device shown in FIG. 2 will be described.

Figure 19:
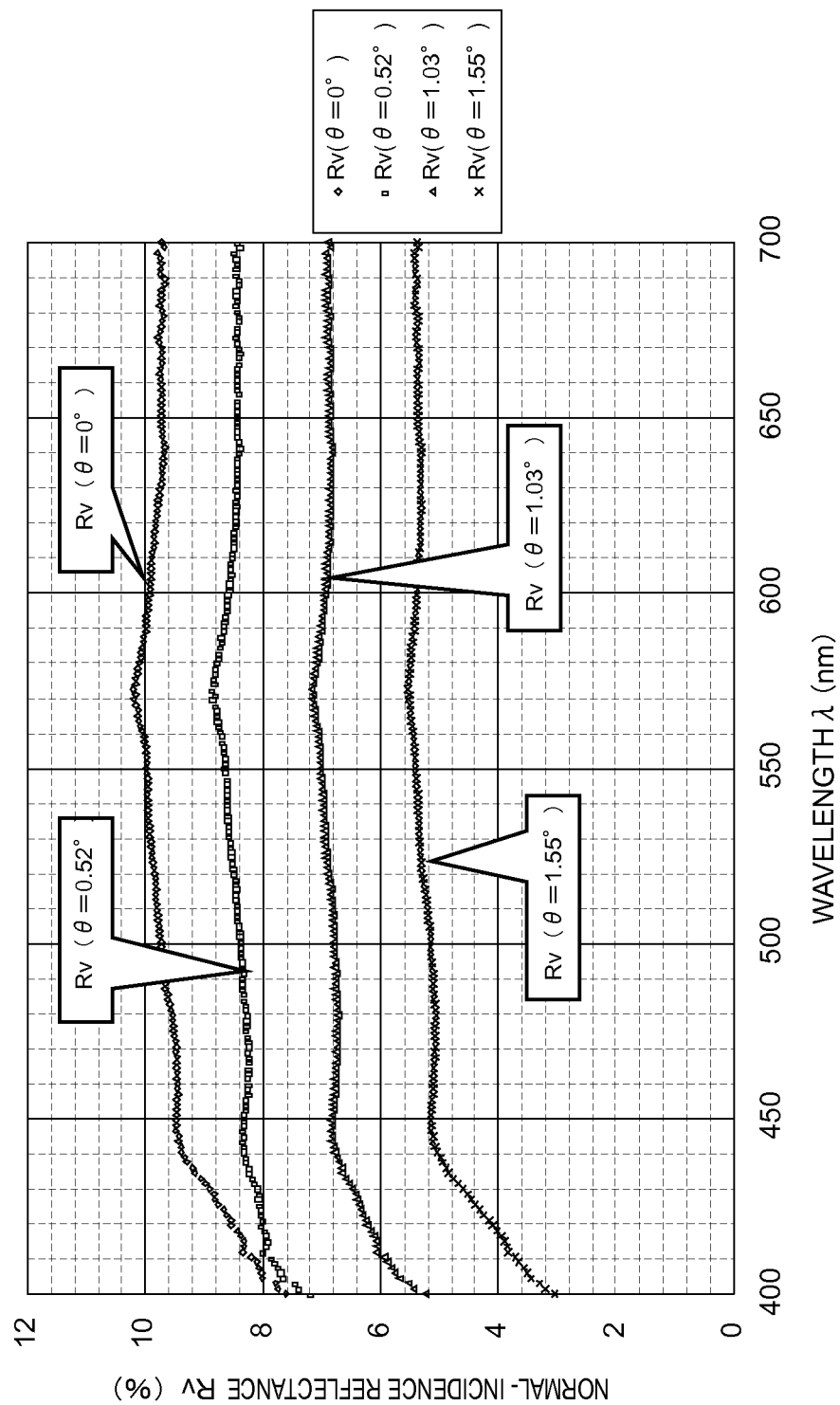
FIG. 19 shows reflectance distributions of a glass plate with a film formed thereon for four angles of tilt, which were measured by the reflectance measuring type film thickness measuring device, the angle of the reference plane being set to 0 and included in the four angles.

FIG. 19 shows reflectance distributions of a glass plate with a film formed thereon for four angles of tilt, which were measured by the reflectance measuring type film thickness measuring device 200. The angle of the reference plane is set to 0 and included in the four angles. Reflectance was measured by the spectroscopic sensor 213.

Figure 20:
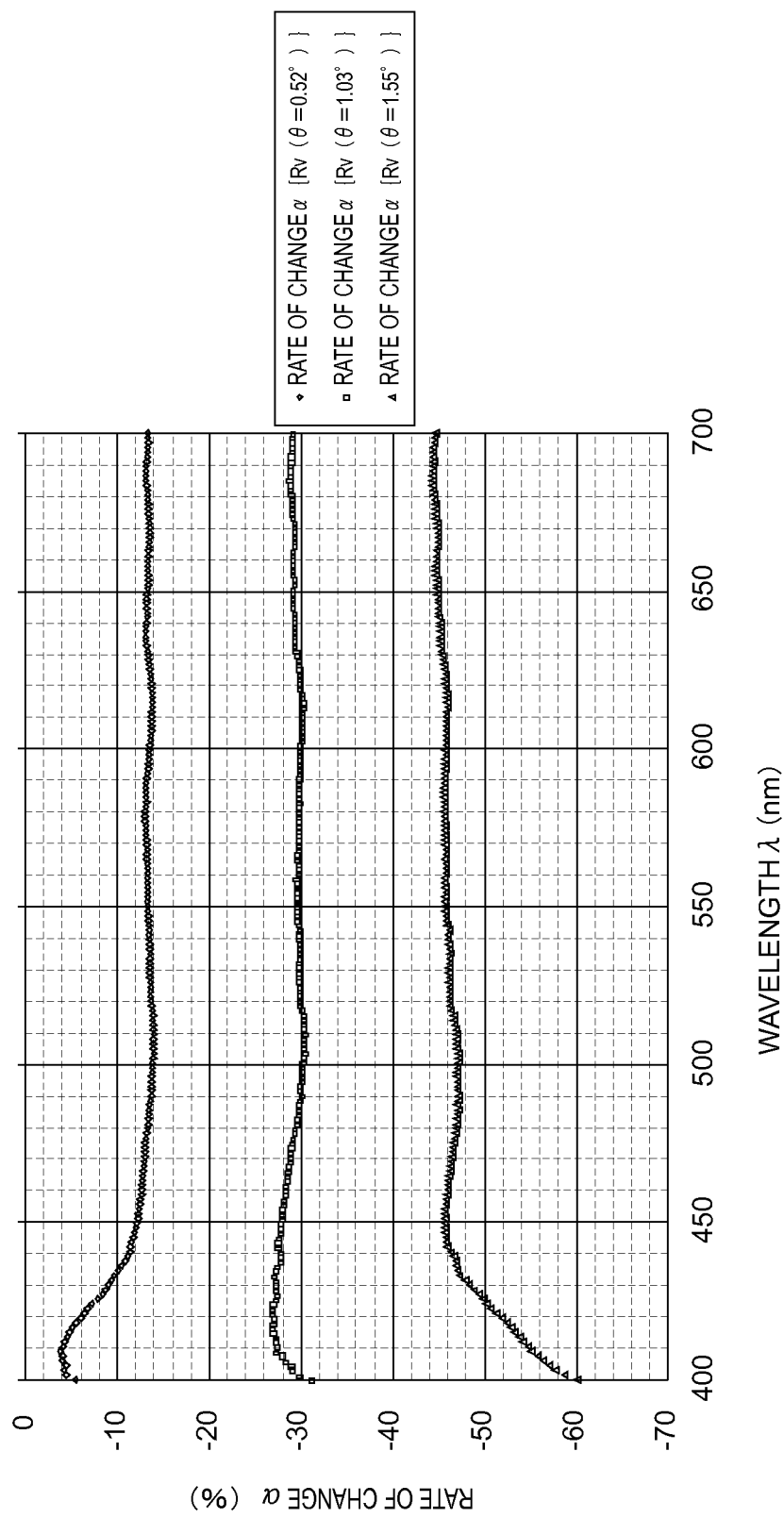
FIG. 20 shows rates of change of reflectance for the three angles of tilt besides the angle of the reference plane with reference to reflectance for the level.

FIG. 20 shows rates of change of reflectance for the three angles of tilt besides the angle of the reference plane with reference to reflectance for the reference plane. The rate of change is defined by the following equation.

$$\alpha = \frac{Rv(\theta) - Rv(0)}{Rv(0)} \times 100 \quad (16)$$

$Rv(\theta)$ and $Rv(0)$ represent values of reflectance for angle of tilt of $\theta$ and that of 0, respectively. According to FIG. 20, the rate of change is approximately $-14\%$ even for angle of tilt of $\theta=0.52°$. The rate of change is very great.

Figure 21:
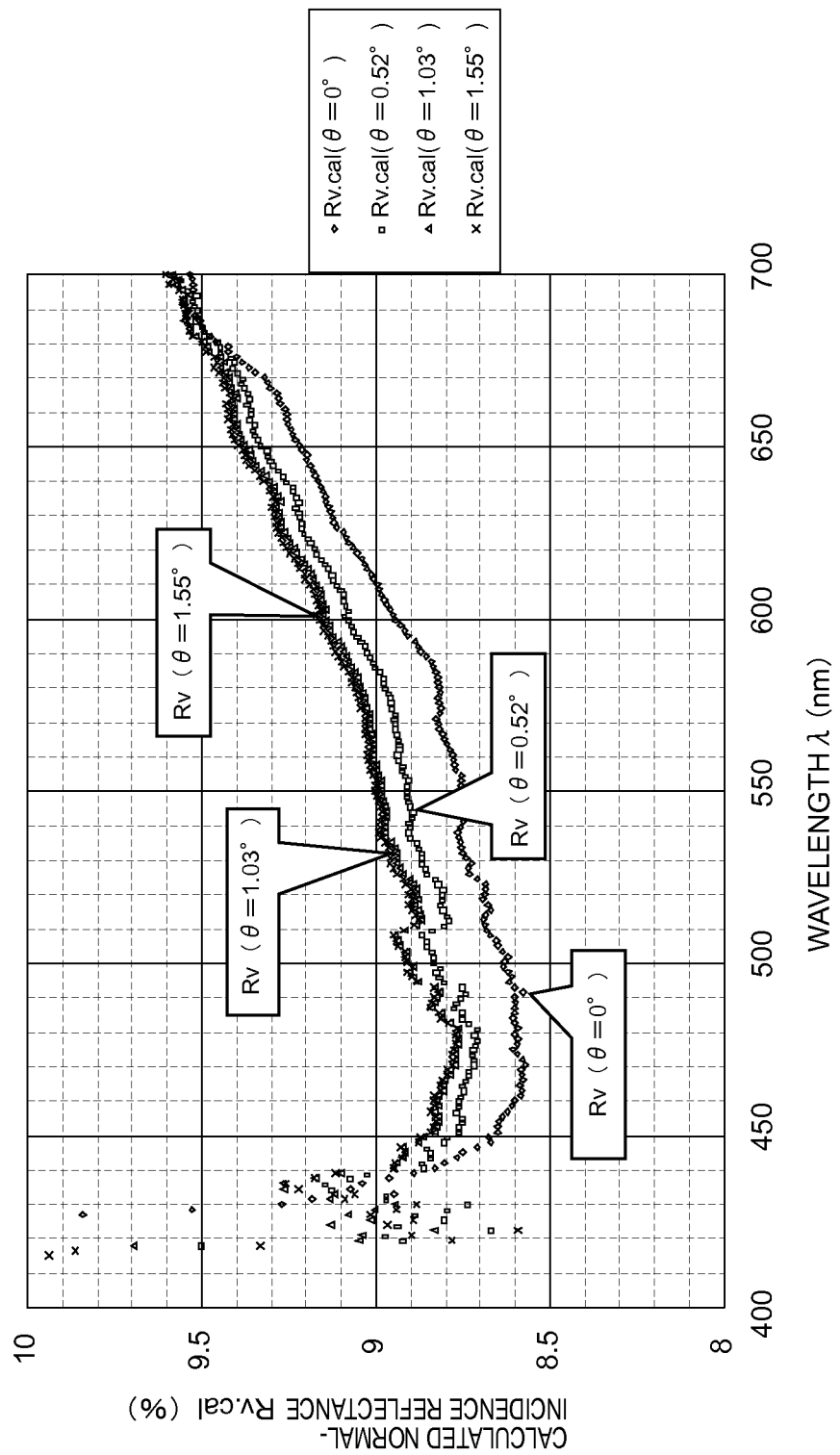
FIG. 21 shows reflectance distributions of a glass plate with a film formed thereon for four angles of tilt, which were measured by the transmittance measuring type film thickness measuring device, the angle of the reference plane being set to 0 and included in the four angles.

FIG. 21 shows reflectance distributions of a glass plate with a film formed thereon for four angles of tilt, which were measured by the transmittance measuring type film thickness measuring device. The angle of the reference plane is set to 0 and included in the four angles. Reflectance was calculated from transmittance measured by the spectroscopic sensor 113.

Figure 22:
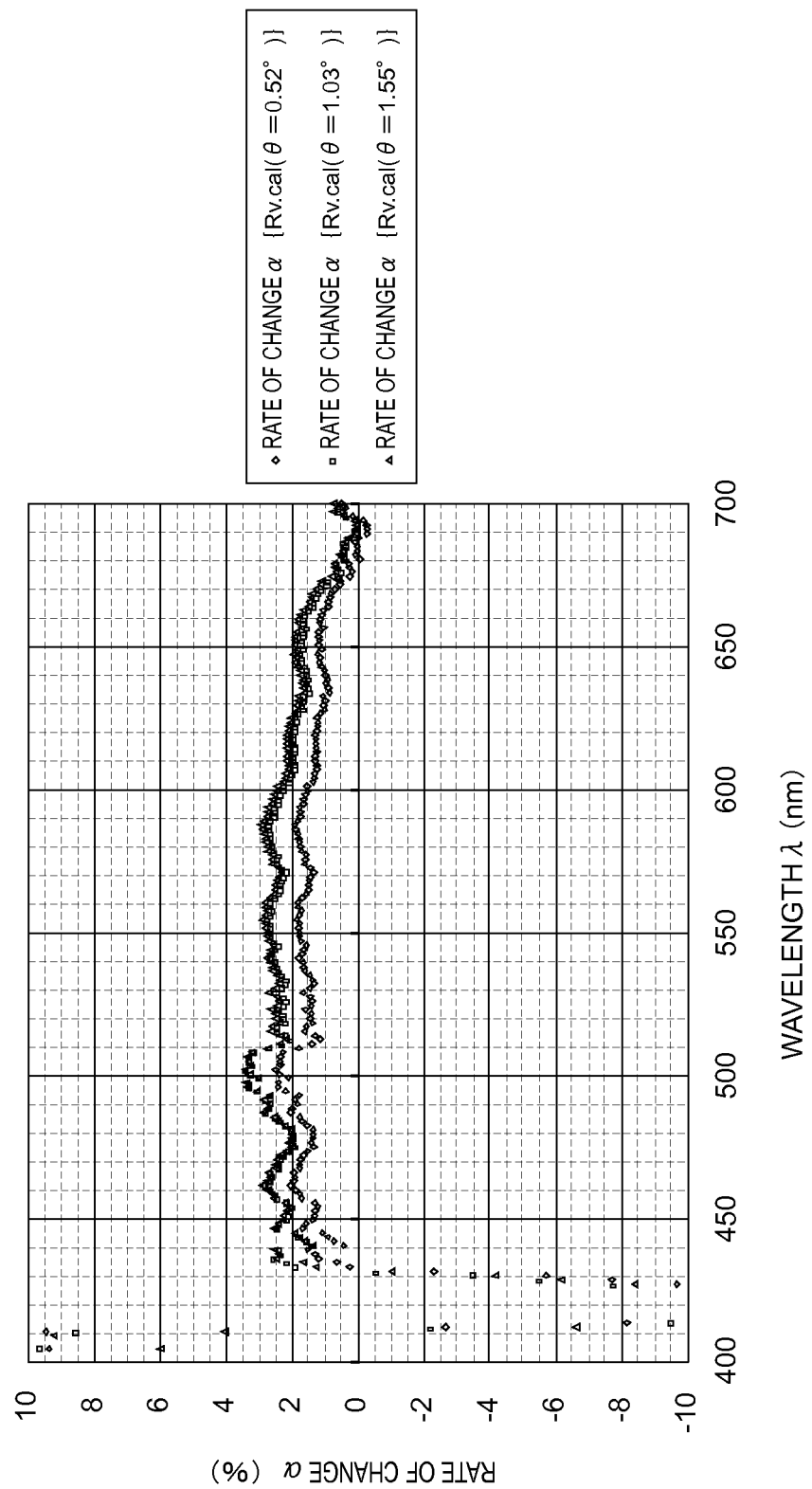
FIG. 22 shows rates of change of reflectance for the three angles of tilt besides the angle of the reference plane with reference to reflectance for the level.

FIG. 22 shows rates of change of reflectance for the three angles of tilt besides the angle of the reference plane with reference to reflectance of the reference plane. The rate of change is defined by Equation (16). According to FIG. 22, the rate of change is 2% or smaller for almost all wavelengths in the case of angle of tilt of $\theta=0.52°$ and 3% or smaller for almost all wavelengths in the case of angle of tilt of $\theta=1.03°$ and in the case of angle of tilt of $\theta=1.55°$. Compared with the results of FIG. 20, influence of angle of tilt relative to the reference plane is extremely small.

As to a sample of a transparent substrate of polyethylene terephthalate with a transparent conductive oxide (TOC) film formed thereon, reflectance distributions for plural angles of tilt are obtained by the transmittance measuring type film thickness measuring device and then thickness of the film is obtained.

Figure 23:
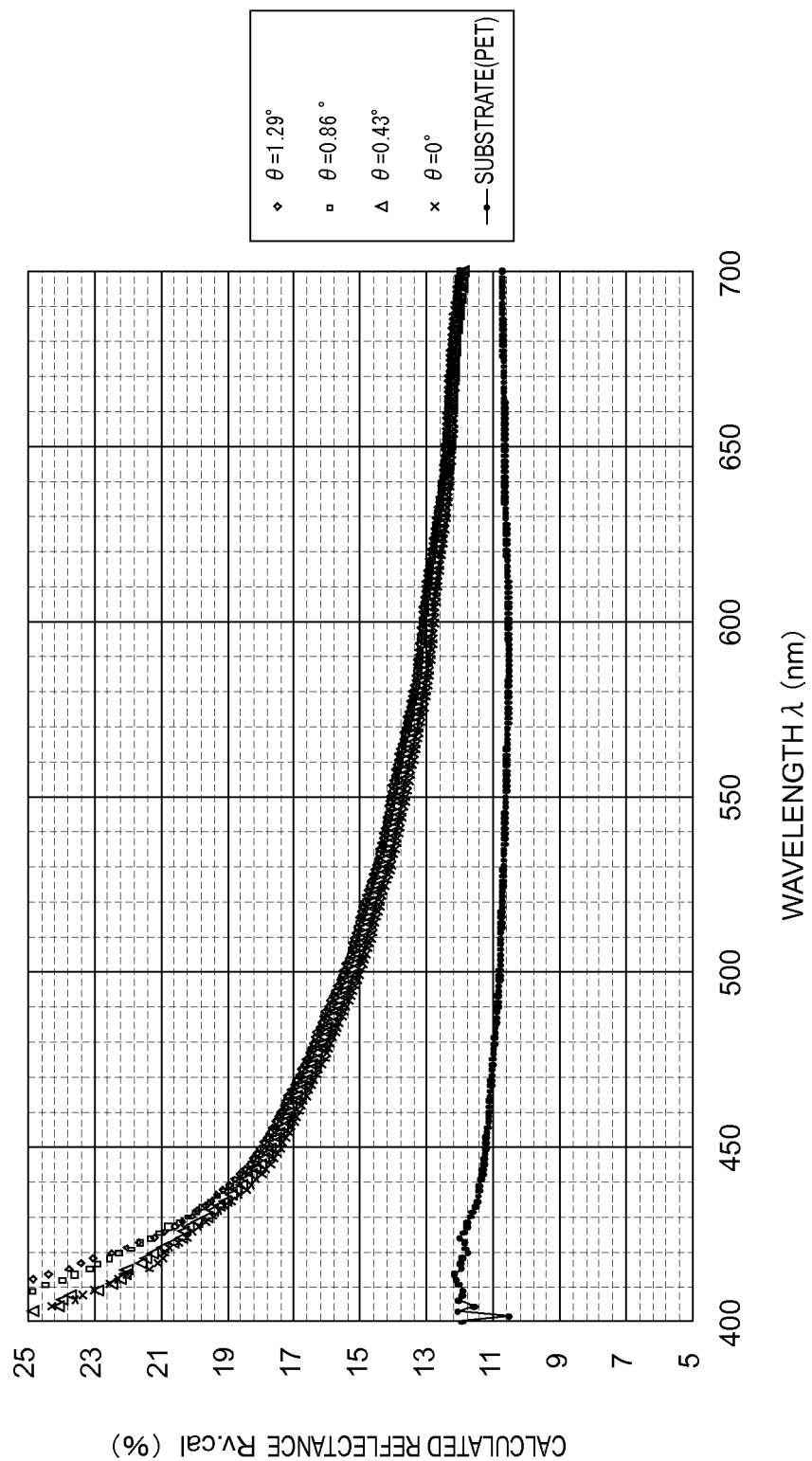
FIG. 23 shows reflectance distributions of the transparent substrate of polyethylene terephthalate with a transparent conductive oxide (TOC) film formed thereon for four angles of tilt, which were obtained by the transmittance measuring type film thickness measuring device, the angle of the reference plane being set to 0 and included in the four angles.

FIG. 23 shows reflectance distributions of the transparent substrate of polyethylene terephthalate with a transparent conductive oxide (TOC) film formed thereon for four angles of tilt, which were obtained by the transmittance measuring type film thickness measuring device 100. The angle of the reference plane is set to 0 and included in the four angles. Reflectance was calculated from transmittance measured by the spectroscopic sensor 113.

Figure 24:
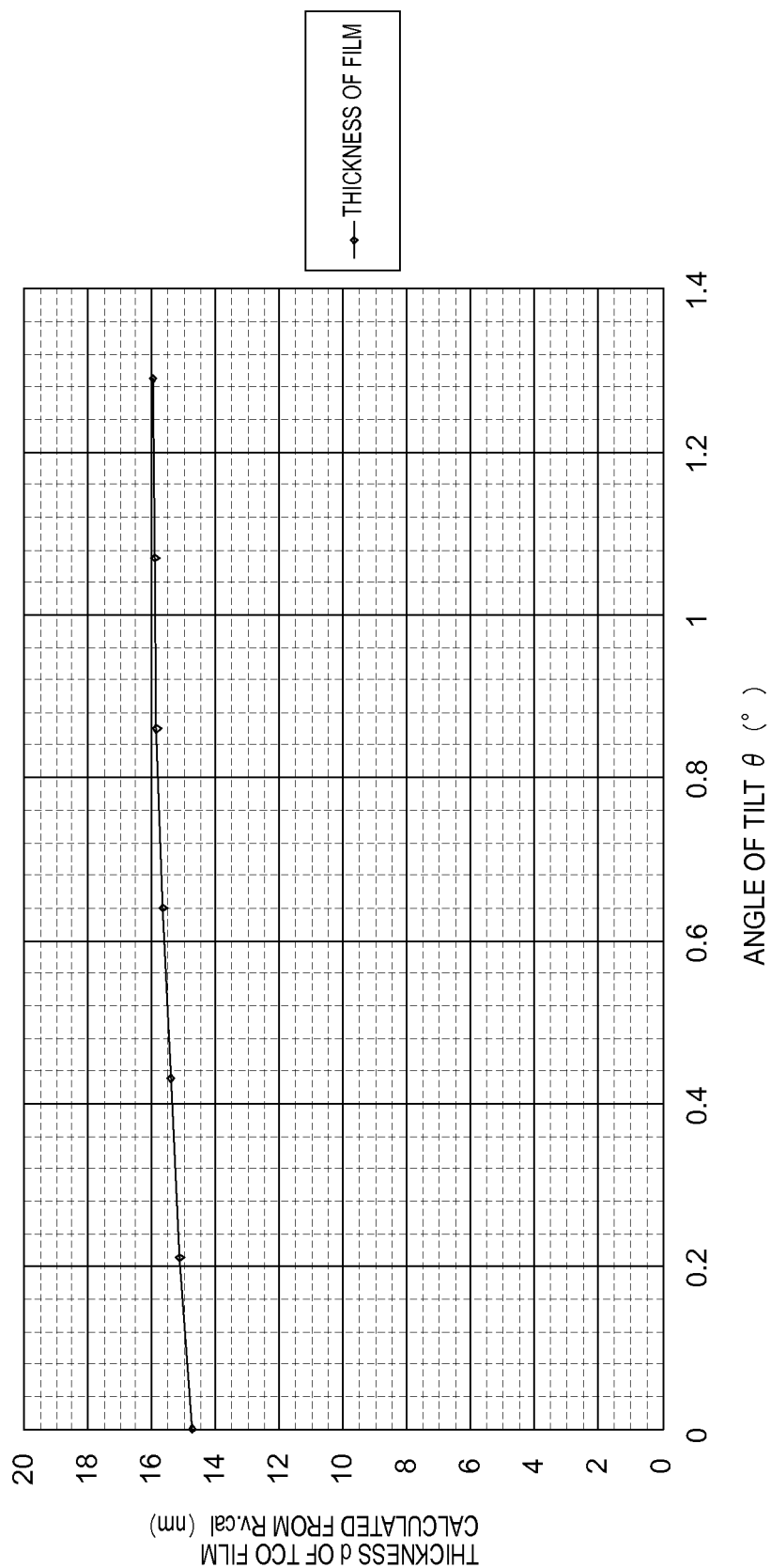
FIG. 24 shows values of thickness of a transparent conductive oxide film for seven angles of tilt, which were obtained by the transmittance measuring type film thickness measuring device, the angle of the reference plane being set to 0 and included in the seven angles.

FIG. 24 shows values of thickness of a transparent conductive oxide film for seven angles of tilt, which were obtained by the transmittance measuring type film thickness measuring device 100. The angle of the reference plane is set to 0 and included in the seven angles. Index of refraction of the substrate is 1.621 while index of refraction of the film is 2.21, and thickness of the film is 14.7 nm in the case of angle of tilt of 0°. In the case of angle of tilt of 1.29°, thickness of the film is 16 nm and a difference in thickness of the film between the case of angle of tilt of 1.29° and the case of angle of tilt of 0° is 1.3 nm. That is, when angle of tilt is 1° or smaller, error of thickness of the film is 1 nm or smaller. Thus, the transmittance measuring type film thickness measuring device is capable of maintaining a high accuracy for a change in angle of tilt with reference to the horizontal surface of an measuring object.

What is claimed is:

1. A film thickness measuring device, comprising:
a spectroscopic sensor configured to measure spectroscopic data of a film coated on a substrate; and
a data processor configured to:
obtain measured color characteristic variables from the measured spectroscopic data,
compare the measured color characteristic variables with plural sets of theoretical color characteristic variables corresponding to plural sets of values, each set including one of plural values of thickness and one of plural values of index of refraction of the film,
determine index of refraction of the film using the set of values corresponding to the set of theoretical color characteristic variables which minimizes a difference between the set of theoretical color characteristic variables and the measured color characteristic variables,
and determine thickness of the film using the index of refraction of the film.

2. A film thickness measuring device according to claim 1, wherein the spectroscopic sensor is configured to measure transmittance distribution of the film coated on the substrate, and the data processor is configured to
obtain reflectance distribution from the measured transmittance distribution, and
obtain the measured color characteristic variables from the reflectance distribution.

3. A film thickness measuring device according to claim 1, further comprising a memory configured to store the plural sets of theoretical color characteristic variables corresponding to the plural sets of values.

4. A film thickness measuring device according to claim 1, wherein the data processor is configured to use color tristimulus values of reflection color as color characteristic variables.

5. A film thickness measuring method by which thickness of a film coated on a substrate is measured by a film thickness measuring device including a spectroscopic sensor and a data processor, the method comprising the steps of:
measuring by the spectroscopic sensor spectroscopic data of the film coated on the substrate;
obtaining by the data processor measured color characteristic variables from the measured spectroscopic data;
comparing the measured color characteristic variables with plural sets of theoretical color characteristic variables corresponding to plural sets of values, each set including one of plural values of thickness and one of plural values of index of refraction of the film, and determining index of refraction of the film using the set of values corresponding to the set of theoretical color characteristic variables which minimizes a difference between the set of theoretical color characteristic variables and the measured color characteristic variables; and
determining thickness of the film using the index of refraction of the film.

6. A film thickness measuring method according to claim 5, wherein in the step of measuring the spectroscopic sensor measures a transmittance distribution of the film coated on the substrate and in the step of obtaining the measured color characteristic variables the data processor obtains a reflectance distribution from the measured transmittance distribution and further obtains the measured color characteristic variables from the reflectance distribution.

7. A film thickness measuring method according to claim 5, wherein in the step of measuring the spectroscopic sensor the spectroscopic sensor measures spectroscopic data of the film coated on the substrate at plural points, in the step of obtaining the measured color characteristic variables the data processor obtains plural sets of measured color characteristic variables which correspond to the plural points and in the step of determining index of refraction the data processor obtains index of refraction of the film using the plural sets of measured color characteristic variables.

8. A film thickness measuring method according to claim 5, wherein color characteristic variables are tristimulus values of reflection color.

* * * * *